United States Patent [19]

Masson

[11] Patent Number: 4,527,246
[45] Date of Patent: Jul. 2, 1985

[54] HOT WATER HEATING SYSTEM CONTROL DEVICE

[75] Inventor: Vijay Masson, Forest Hills, N.Y.

[73] Assignee: Heat-Timer Corporation, Fairfield, N.J.

[21] Appl. No.: 368,380

[22] Filed: Apr. 14, 1982

[51] Int. Cl.³ .............................................. F24H 3/06
[52] U.S. Cl. ................... 364/505; 237/8 R; 364/145; 364/557
[58] Field of Search ............... 364/143, 144, 145, 505, 364/510, 557; 236/46 R, 46 F, 91 F, 91 G, 91 R; 237/8 R, 8 A, 19

[56] References Cited

U.S. PATENT DOCUMENTS

| | | | |
|---|---|---|---|
| 3,397,841 | 8/1968 | Kieslich | 237/8 R |
| 4,019,677 | 4/1977 | Dotschkal et al. | 237/8 R X |
| 4,217,646 | 8/1980 | Caltagirone et al. | 364/505 X |
| 4,230,267 | 10/1980 | Dotschkal et al. | 237/8 R X |
| 4,293,915 | 10/1981 | Carpenter et al. | 364/145 X |
| 4,381,075 | 4/1983 | Cargill et al. | 237/19 X |
| 4,396,148 | 8/1983 | Masson | 236/46 R X |
| 4,409,662 | 10/1983 | Rao | 364/557 |

OTHER PUBLICATIONS

Barber-Colman Co. advertisement, "Heating and Ventilating", Oct. 1947, p. 50.

*Primary Examiner*—Errol A. Krass
*Assistant Examiner*—Edward R. Cosimano
*Attorney, Agent, or Firm*—McAulay, Fields, Fisher, Goldstein & Nissen

[57] ABSTRACT

A control device for a hot water heating system which has a boiler, water pump and motor control mixing valve. The control device is responsive to the outside temperature for turning the pump on and off when the outside temperature drops below or exceeds a predetermined pump set point. A set of water reset ratios is defined and a range of offset adjustments are provided for each ratio and are selected for controlling the heat level within the system. The desired water temperature is periodically determined for the output of the mixing valve for the selected water reset ratio and offset and is receptive of the actual water temperature for comparing the actual water temperature to the desired water temperature. The mixing valve is then controlled by opening or closing same to make the actual water temperature correspond to the desired or computed water temperature.

11 Claims, 9 Drawing Figures

HOT WATER HEATING SYSTEM CONTROL DEVICE

BACKGROUND OF THE INVENTION

The present invention relates to a hot water heating control system and in particular to an electronic control device utilizing a solid-state design and microprocessor technology which is programmable by the user and operable by one with little or no computer knowledge.

While heating system control devices are known in the art, such conventional devices have little flexibility in control, especially with the control of hot water heating systems wherein the output of a boiler is fed by a pump to a motorized mixing valve along the main hot water line of the heating system. The ability to adjust various parameters in the heating system has taken on new importance with the considerable increase in heating fuel costs.

In conventional control devices, the mining valve is controlled by conventional motor control systems which involve inefficient overshooting and the inability to accommodate the system to particular climatic conditions.

Further, standard off-the-shelf control systems are not adaptable to different buildings and each device must be fitted with customized parts for particular applications.

Other disadvantages of the conventional systems are that they do not control the pump, they do not conserve the life of the mixing valve control motor and they do not enable the system to anticipate changeovers from night-time to day-time conditions especially when unexpected temperature changes have occurred external of the building. Conventional systems have difficulty in adapting the initial warm-up period in the morning and thus buildings remain cold even during the early morning working hours, which is highly undesirable.

SUMMARY OF THE INVENTION

The main object of the present invention is to provide a hot water heating system control device which is capable of being adaptable to any heating requirements of a building without the addition of new circuitry, which is easy to operate and which overcomes the disadvantages of the prior art devices as set forth hereinabove.

Another object of the present invention is to provide a hot water heating system control device which allows for a control of the pump, that is which shuts off the pump when the outside temperature rises above a pump set point.

A further object of the present invention is to provide a control device which allows for a morning boost in the heating system to enable the heating system to be at a low temperature during a set back period, usually during the evening, but still adequately warm the building in anticipation of the normal temperature period, which is generally the start of regular working hours. The boost can be a fixed boost which precedes the normal temperature period by a variable time in dependence on the outside temperature, or, preferably, the boost can be selected by the user and anticipates the normal temperature period by a variable amount depending upon the outside temperature.

A still further object of the present invention is to provide a step control for the valve control motor which provides a digital damping of the motor to help conserve energy and preserve the life of the valve motor and related components.

Still another object of the present invention is to control the water temperature of the hot water heating system in dependence upon a selected water reset ratio and offset which in effect controls the manner in which the system adapts to outside temperature changes.

These and other objects of the present invention are provided by the control device for a hot water heating system according to the present invention which comprises means responsive to the outside temperature for turning the heating system pump on and off when the outside temperature drops below or exceeds a predetermined pump set point, means defining a set of water reset ratios of the outside temperature to the water temperature and a range of offset adjustments for each ratio including means for selecting a water reset ratio and offset therefor, means for periodically determining the desired water temperature at the output of the mixing valve for the selected water reset ratio and offset and receptive of the actual water temperature for comparing the actual water temperature to the desired water temperature and means for step controlling the mixing valve to open same when the actual water temperature drops below the desired water temperature and for closing same when the actual water temperature exceeds the desired water temperature.

In accordance with the present invention, the control device has a microprocessor heating control circuit which is designed to control a building's heating system effectively and economically to produce a smooth flow of heat when and where it is needed and to the degree it is desired.

The device further comprises timing means for dividing each day into at least one normal period and at least one set back period for storing the starting times for each period. The device is capable of displaying all of the sensed temperatures and can be programmed for carrying out complex computations automatically. The controls for the devices are simple switches and knobs and the display elements therefor include a digital display and function lights.

These and other objects of the present invention will become clear from the detailed description of the present invention and in accordance with the drawings, wherein:

DETAILED DESCRIPTION OF THE PREFERRED EMBODIMENTS

Figure 1:
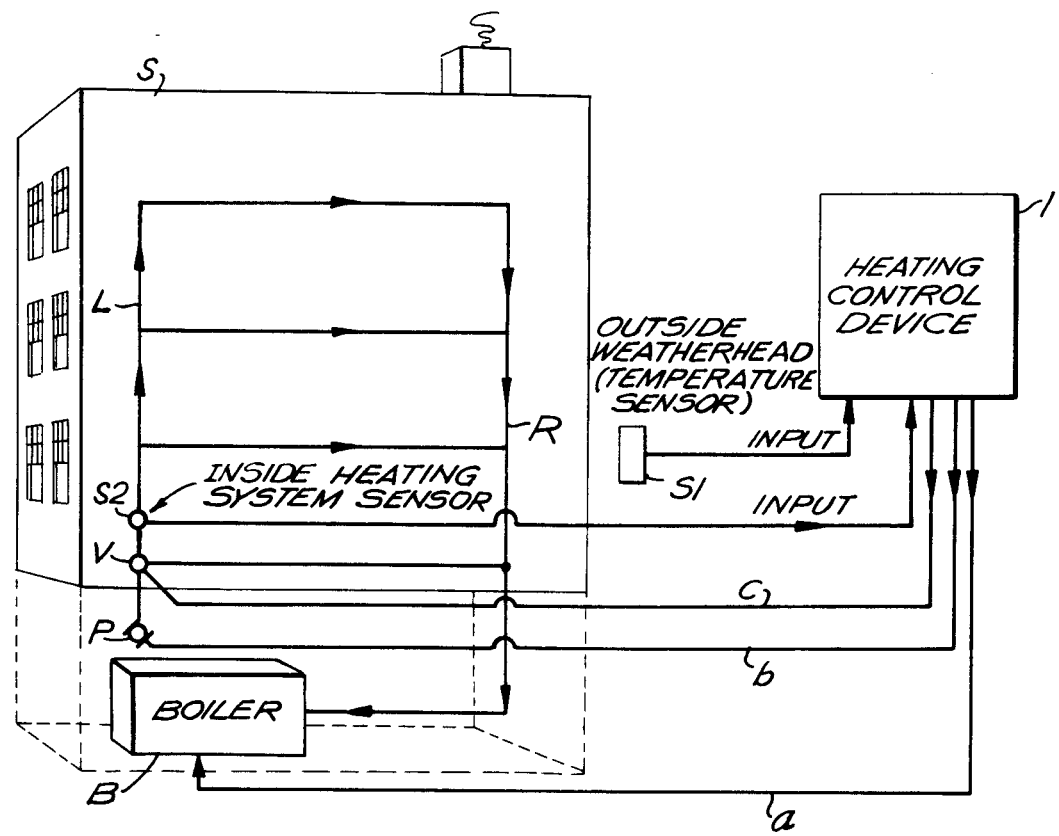
FIG. 1 is a schematic representation of the control device and its connection to a hot water heating system in accordance with the invention.

FIG. 1 shows a schematic of the connection of the control device 1 of the present invention to a heating system which includes a boiler B within the building structure S, a main hot water line L and a return line R. In conventional hot water heating systems, the output of the boiler B is pumped through the main line D by a pump P which preferably is followed by a three-way motorized mixing valve V which mixes the output of boiler B with hot water being circulated through return line R.

A sensor S1 is disposed, preferably on the north side of building S and provides the outside weatherhead temperature input to the heating control device 1 and a sensor S2 is provided at the output of the mixing valve V and provides the actual hot water temperature input for the heating control device 1.

The heating control device has output lines a-c connected to the boiler B, the pump P and the mixing valve V so as to exercise control over these devices. In certain hot water heating systems, the mixing valve V is not utilized and thus the heating control device must control the boiler by turning same on and off in order to control the actual water temperature sensed at S2.

The device 1 continuously monitors the outside temperature by means of sensor S1 at the same time that it monitors the actual water temperature of the hot water heating system by means of the inside temperature sensor S2 which is located at the output of the mixing valve V. On the basis of the combined information, as will be explained hereinafter, the device 1 sends instructions to the pump P, the mixing valve V and the boiler B to control the flow of hot water through the mixing valve into the circulation system to establish desired hot water temperatures which in turn create levels of warmth and comfort in a building.

The control device according to the present invention, establishes two heat levels for the building. One level is called the normal level and is generally utilized during daytime or working hours and is higher for when people are in the building and up and around. The second heat level is called the set-back level and is called the set-back level and is generally at night for when lower indoor temperatures are desired. The device 1 has a seven day electronic clock which shifts from one heat level to the other whenever desired. Up to eight changes a day may be made and each day of the week can be programmed differently, including weekends as will be explained hereinafter.

The philosophy of the control of the hot water heating system is a complete control to obtain increased efficiency. The pump P is controlled so as to be prevented from operating unless the outside temperature sensed by sensor S1 is at or below a preselected pump set point.

An optimum start or morning boost is provided which varies in its duration with variances in outdoor temperatures while an early shutdown feature enables the automatic reduction in the water temperature earlier than scheduled whenever the outside temperature justifies such an early shutdown.

The management of the mixing valve is based on a water reset ratio control supported by an offset adjustment and the range of the two makes the control applicable to practically any climatic condition and heat loss characteristic for the building S.

Moreover, the microprocessor control of the device 1 controls the opening and closing of the mixing valve with a digital damping which minimizes movements of its components and thereby reduces the wear and tear on the valve.

The control device is also capable of controlling hot water systems without mixing valves by shutting the boiler on and off with the same precision control as that for controlling the mixing valve.

In operation, the outside temperature is constantly fed by the temperature sensor S1 to the control device 1 which is advantageously located on the north side of building S. At the same time the actual water temperature is fed from sensor S2 mounted on main line L of the hot water heating system.

When the outside temperature drops to the pump set point which is set by thumb wheel switch 21, the pump is activated, sending hot water through the mixing valve V and into the main line L of the heating system and the by-pass pipes connected thereto.

Thus if the pump set point at switch 21 is shown as 58°, the pump will not be activated until the outside temperature drops to 58° F. Should the outside temperature later rise to 60° F., the pump will immediately shut off.

Figure 2:
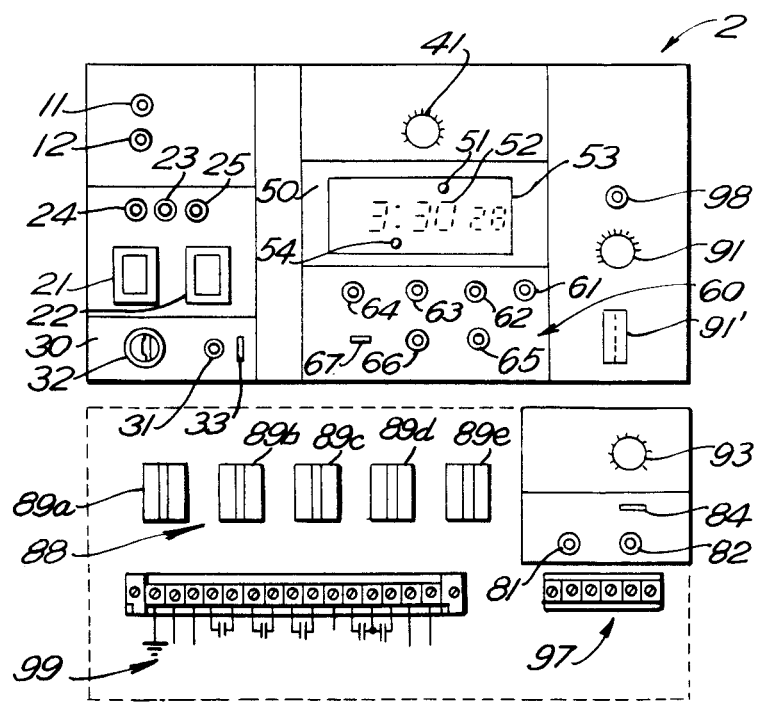
FIG. 2 is a front view of the control panel for the device according to the invention.

The three way mixing valve V adjusts its openings in accordance with a predetermined reset ratio and offset adjustment setting controlled by thumb wheel switch 22 and potentiometer 41 respectively shown in FIG. 2. These two controls in combination with the outside temperature establish a water temperature hot enough to create a desired level of warmth in the building for the normal periods of operation. A setback control 91 is a potentiometer which allows the user to determine a so-called night water temperature which is from 0° to 85° F. colder than that during the normal period.

The system control circuitry for carrying out the above is shown in more detail with respect to FIGS. 2-7 as will be explained hereinafter.

With regard to FIG. 2, the front panel of the device according to the present invention includes a plurality of switches and display elements for programming the device to automatically carry out the heating system control for 24 hours each day and for seven days a week.

The display panel 2 includes the pump set point control 21 which determines the outside temperature at which the pump is activated and the heating of a building is undertaken. The thumb wheel switch 21 enables the operator to fix the pump set point at between 45° to 74° F. and display light 24 indicates when the pump is activated.

If the pump set point is set at 58° F., the pump will be activated when the outside temperature drops to 58° F. The control circuitry for the system has a 2° F. differential which prevents a rapid on/off pattern to develop. With the pump set point at 58° F., the pump will turn off when the outside temperature reaches 60° F. and will go back on when the outside temperature drops below 58° F.

The thumb wheel switch 21 also includes an on and off position to enable the pump to operate continuously or remain shut off, respectively if desired.

Once the pump set point is reached and the pump is activated to move hot water from the boiler into the heating system, the amount of hot water directed into the heating system is determined by the settings of the reset ratio control and the offset adjustment as will be explained hereinafter.

Figure 7A:
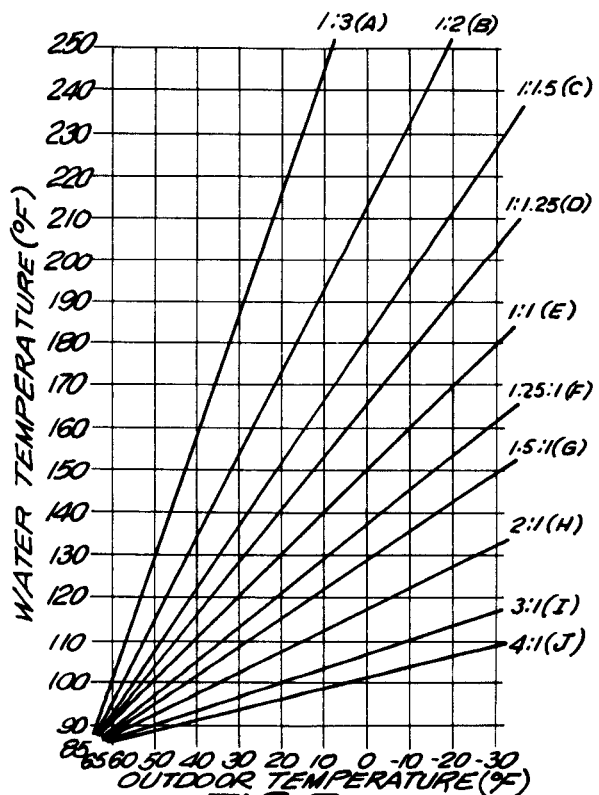
FIGS. 7a and 7b are graphical representations of the water reset ratios and ranges of offset adjustments for one water reset ratio in accordance with the present invention.
Figure 4:
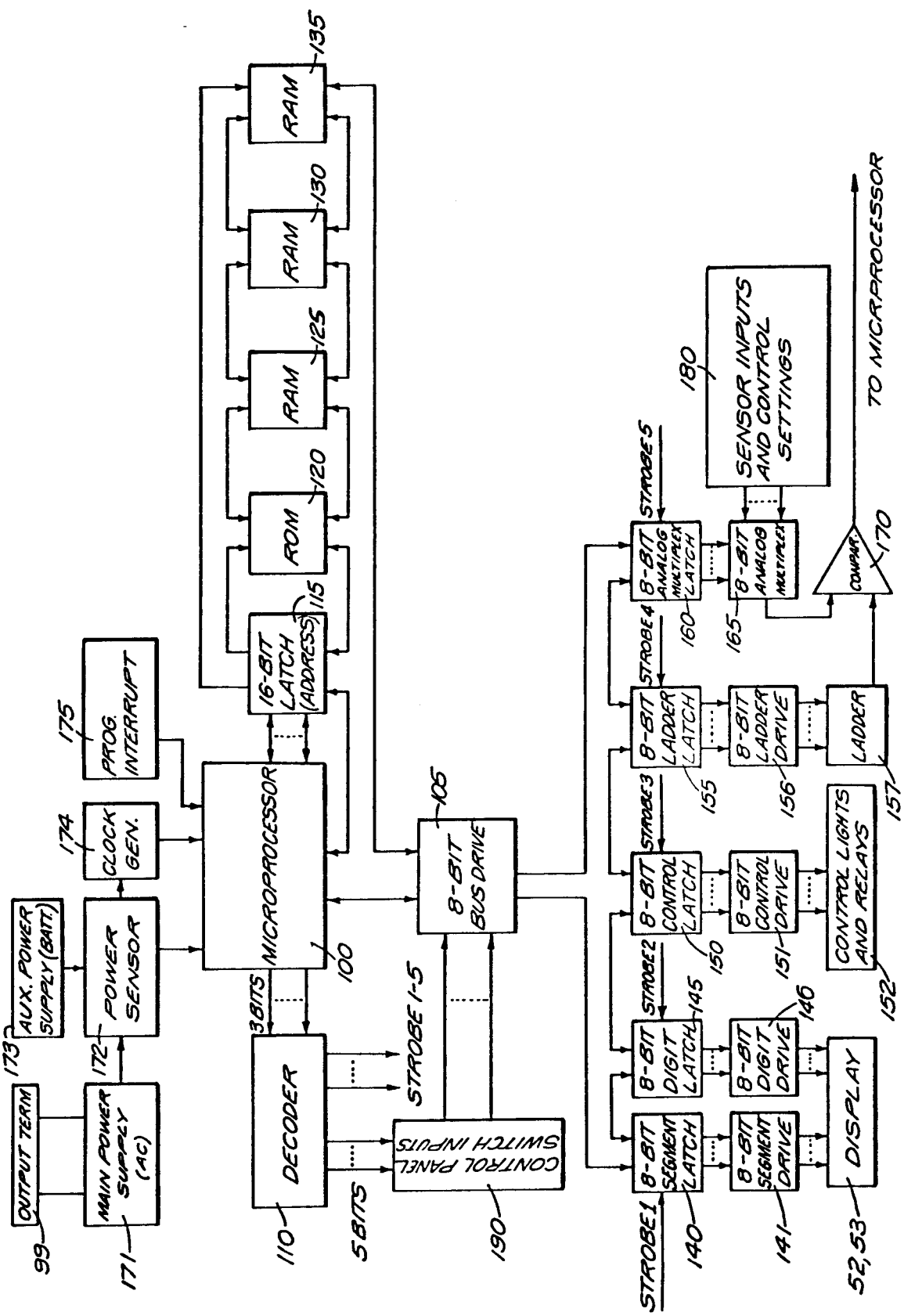
FIG. 4 is a block diagram of the circuit of the device according to the present invention.

In the memory of the microprocessor control shown in FIG. 4, are disposed 10 different reset ratios shown in graphical representation in FIG. 7a which vary from 1:3 to 1:1 to 4:1. The ratio is the outside temperature to the water temperature and at a 1:1 ratio, every degree decrease in the outside temperature means a one degree increase in the computed water temperature. At a 1:3 ratio, every degree change in the outside temperature means a three degree inverse change in the computed water temperature. At a 4:1 ratio, every four degree change in outside temperature means a one degree inverse change in the computed water temperature.

The reset ratio is fixed by the operator by means of the thumb wheel control switch 22 which has the 10 ratios represented by letters of the alphabet A-J as shown in FIG. 7a. The graph in FIG. 7a shows the relationship between the computed water temperature and the outside temperature for each of the seven ratios. It is apparent that ratios at D-F apply to an average building, while those at G-J apply to a more efficient one and those at A-C apply to a looser building with greater heat loss.

Prior experience based on original design specifications of the heating system will determine which reset ratio is chosen. However, the parameters of each reset ratio can be extended quite substantially by the range of the offset adjustments as explained hereinafter.

Figure 7B:
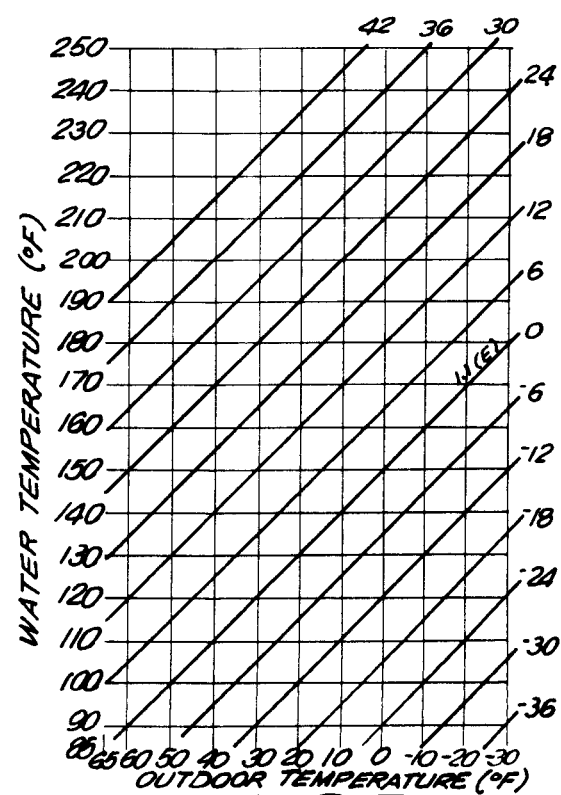

The offset adjustment control includes the potentiometer 41 which is a fine tuning device that provides an added range of 84° to each of the reset ratios, that is, 42° above the reset ratio curve and 42° below it. Each change of one degree on the offset adjustment control changes the computed water temperature, up or down, by one degree and this applies to all 10 reset ratios. The graph in FIG. 7b shows an example of the offset curves in 6° increments for the 1:1 reset ratio setting. This shows how the offset adjustment applies and influences each of the reset ratios. The offset adjustment control is continuously variable and it should be clear that the six degree increments are offered simply for the convenience of explanation.

The combination of a wide range of reset ratios and offset adjustments makes the control applicable to any climatic or heat loss condition likely to be encountered anywhere. The objective of these controls is to provide a water temperature, in relation to outside temperature, which will produce a comfort level that can be considered normal for when people are up and around in a building and to provide a set back period when energy is to be saved and for use when the building is vacant or people are away or asleep.

The normal and setback heat levels is somewhat analogous to the function of a residential clock thermostat. The higher heat level called normal, is a function of three factors, the reset ratio, the offset adjustment and the outside temperature. For any combination of these three factors, there is a computed water temperature which will closely match the actual water temperature.

The three basic factors effect the amount of hot water directed through the mixing valve V to establish a water temperature in the heating system which creates a comfort level in the building that is called normal. The lower setback heat level is created by reducing the computed water temperature by means of control knob 91 which is the setback control and which can set back the water temperature from 0° to 85° F. These numbers represent the infinitely variable number of °F. that the computed water temperature can be lowered to create the setback heat level condition.

For example, if the computed water temperature is 160° F., the water temperature creates the normal heat level and by setting the setback control to 40, the setback water temperature will be 120° during the setback period.

An LED indicator light 25 goes on when the control is the normal mode and the LED indicator light 98 goes on when the device is in the setback mode.

As the outside temperature varies, the setback water temperature also varies, always maintaining the degree difference fixed by the setback control knob 91. This difference in relation to the normal temperature is also maintained should the offset control or reset ratio be changed.

Once the normal and setback computed water temperatures are set, the two resulting heat levels may be programmed to switch from one to the other by electronic timing means including electronic clock as will be explained.

The system also has the ability to manually shift from the setback period level to the normal period level by use of the shift push button 23. In response to the actuation of push button 23, the device will shift from the setback to the normal level for a given period of time (i.e. 90 minutes) and then revert back to the setback period if the program calls for the setback temperature level at that time.

Section 30 of the control panel includes the auto by-pass switch 31 and the key switch 32 for enabling the device to be programmed as will be explained hereinafter. The by-pass switch 31 enables the entire device to be by-passed so that the heating system is in the constant on condition with maximum heat supplied. The program lock switch 32 merely prevents the device programming to be changed when in the locked position as will be explained hereinafter. Switch 33 is a heat-on/heat-off switch which turns off the control device for the non-heating season.

The device operates with two heat levels, the higher heat level normally scheduled for when people are up and about, is called the normal level and the lower one called the setback level is for when people are asleep or the building is unoccupied. The two heat levels can be changed alternately from one to the other up to 8 times a day as programmed into the device and each of the second days of the week can be programmed differently as will be explained.

The programming of the period times is set in sections 50 and 60 of the control panel 2. In section 60, switches 61-67 control the programming of the device as is indicated by the display in section 50 including display elements 51-54.

Switch 67, when pushed from the run to the program position, changes the display section 50 from a display of the current time/temperature to the programmed data. The program mode is effected by the opening of key switch 32 and switch 67 at program and then the hour display button 64 is depressed to set the particular hour desired for the day set in the display. Thereafter the minute switch is depressed and the display will cycle from 1 through 59 until the button is released. The display 51 first displays the first normal period to be set and then the first setback period to be set. If more than one normal period is to be utilized in a 24 hour day, the pressing of the advance button 66 will advance the display to be programmed into the second normal and second setback periods. The pressing of the erase button 65 will erase the current pair of normal and setback setting.

After the day has been completed, the day button 62 is depressed and it switches to the next day. If one desired to have the same timing for each day, the day copy button 61 can be pressed which merely copies the program from the previous day into the day now displayed. The clock is programmed for the entire week in this manner. At the end of the program, the switch 67 is switched to the run position and the key switch 32 is placed in the locked position.

Light 51 indicates the day of the week in the display section 50 and light 54 illustrates whether the time being displayed on section 52 is AM or PM. Display 53 illustrates the actual water temperature when the unit is in the run state as indicated by switch 67.

The display also includes section 10 including lights 11-12 which indicate respectively that the water temperature is being corrected and that the morning boost is in process as will be explained hereinafter.

Two switches 81 and 82 are also provided for obtaining the display of the outside temperature and the computed water temperature when each is pressed and held. They come on the display where the actual water temperature usually appears.

Another function of the control device according to the invention is the addition of the morning boost which provides the surge of heat required in the early morning to overcome low nighttime temperatures and bring a building up to a desired comfort level.

The standard morning boost provided by the control device elevates the water temperature a fixed 10° above its computed level for a period of time that varies with the outside temperature. If the computed water temperature on a given morning was 135° F., it would automatically elevate 10 additional degrees to 145° F.

If the outside temperature is at 5° F., the morning boost is 60 minutes in anticipation of the first normal period and that 65° F. outside temperature, the anticipated boost time is 0. As the outside temperature varies, the duration of the morning boost varies on a linear scale and thus at 55° F. outside temperature, the morning boost will last for 10 minutes, at 45° F. for 20 minutes and at 15° F. for 50 minutes. As soon as the designated boost period is over, the computed water temperature drops 10° and the control resumes its programmed schedule.

The morning boost starts automatically each morning as long as the pump set point is reached and heat is called for. It is synchronized to bring the building to a desired comfort level at the time for the first normal setting to begin. The computer continuously interrogates the outside sensor and on the basis of the data obtained, calculates when the morning boost must begin in order to end at the time programmed for the beginning of the first normal period.

If for example the first normal period is set to start at 7 AM, and the outside temperature is 20° F., the morning boost will last for 45 minutes at that outside temperature and therefore will begin at 6:15 AM. At this earlier time, the computer elevates the computed water temperature by 10° and keeps it at that level for 45 minutes, ending the morning boost at 7 AM.

The morning boost can be eliminated by merely not programming in a first morning setting, that is programming the device to assume the first normal period in the second memory position.

With the circuitry provided at modules 91′ and setting knob 91″, a variable boost is provided which enables the user to select the boost water temperature anywhere in the range from 0°-30°.

The automatic variable boost circuitry can also be used to an effect an automatic early shut-down in an opposite or reciprocal manner. By using the same circuitry and time curves, the heating in the building can be reduced to the setback level earlier than programmed at night if the outside temperature justifies it. Thus, for example, if the nighttime setback heat level is scheduled to start at 11 PM and the temperature outside is at 40° F., the setback heat level will begin 40 minutes earlier or at 10:20 PM instead of 11:00 PM. At 20° F. outside, it would start 15 minutes earlier than scheduled. The early shut-down program brings the water temperature to the setback level at the early shut-down time and there is no decrease of the computed water temperature below that setback level.

The control device is designed to operate with all types of hot water systems, including those without mixing valves. For this purpose, a special control circuit is integrated into the main microprocessor circuits which, when switched on, maintains the required computed water temperatures. It does this by turning the boiler on and off in accordance with the reset ratio and offset adjustment scales discussed hereinbefore. The burner operation is controlled by the burner on/off switch 84 and the burner operation control knob 93. The control knob 93 defines the on and off limits that allow an average water temperature to be maintained. The scale on the control knob ranges from 0° to 15° F. Thus, for example, if the control knob is set at 7° F. and the computer water temperature at a given time is 150°, the boiler will now turn on when the computed water temperature drops to 143° F. and will go off when it reaches 157° F., that is 7° above and 7° below the computed water temperature as determined by the three basic factors at that time. If the control knob were set at 14° F., the boiler would turn off at 14° above the computed water temperature and go on at 14° below it.

The control of the pump, boiler and mixing valve motor is effected by relays 89a-e in conjunction with the output terminals 99. Relay 89a controls the pump, relay 89b is an optional relay for controlling other building functions such as lighting, etc., relay 89c controls the boiler, and relays 89d and 89e control the opening and closing of the motorized valve. The actual output lines are connected to the output terminal which are connected to the loads as illustrated schematically on the control panel face plate.

The terminal strip 97 comprises the input terminals which receive the information from sensors S1 and S2.

Timing diagrams 3a and 3b illustrate the manner in which the valve motor is activated to change the openings on the mixing valve. In accordance with the invention an electronically precise procedure is used to help conserve energy and preserve the life of the valve, motor and components thereof. This procedure is called digital damping.

The ordinary mechanical control simply starts the motor to open the valve and in most cases tends to overshoot its goal, creating a far greater water temperature than is necessary, with the resultant waste of energy.

The control in accordance with the present invention opens and closes the valve in stages, pausing to idle for short periods to see if the actual and computed water temperatures correspond and if not, it activates the valve motor again, then pauses again to test, repeating the process until the two temperatures gradually come together.

This computerized process reduces overshoots and saves enormous wear and tear on the valve components, adding life to the equipment. Additionally, this precise operation eliminates one source of fuel waste.

Figure 3A:
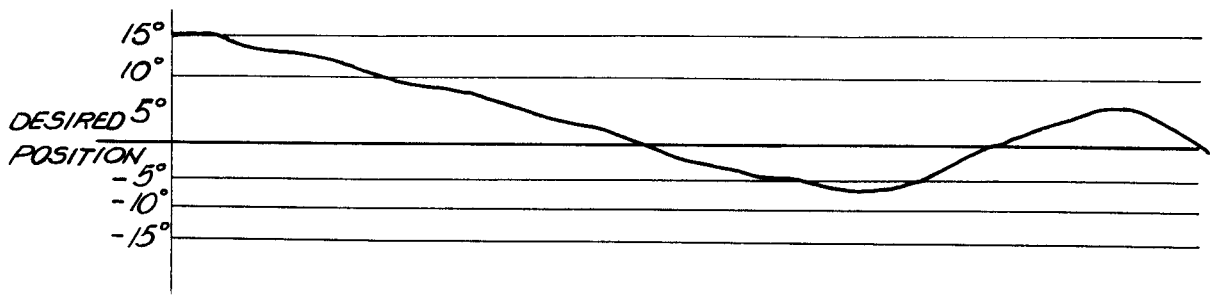
FIGS. 3a and 3b are diagrams showing the operational timing of the mixing valve motor controlled in accordance with the present invention.
Figure 3B:
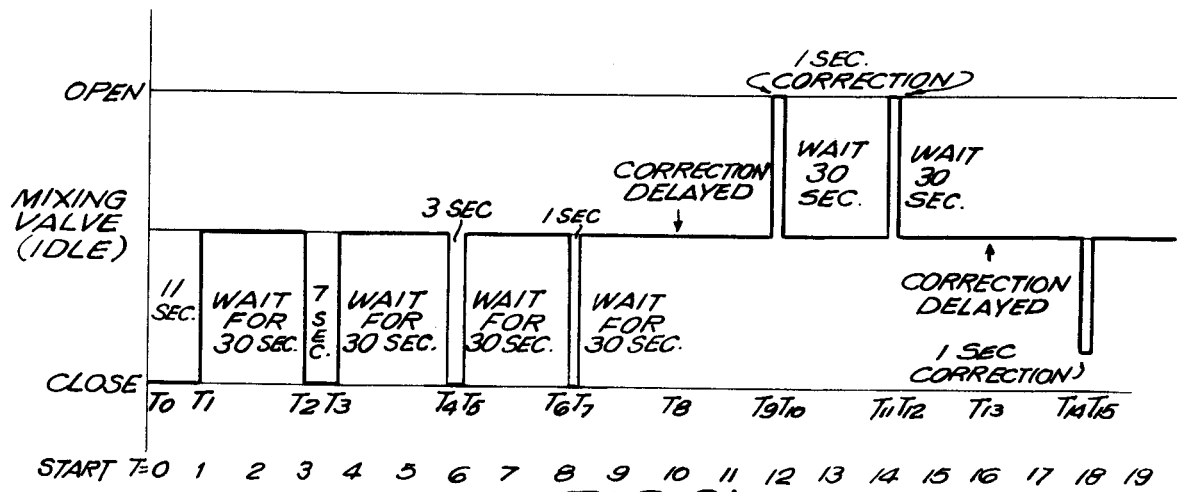

If for example the computed water temperature is 135° but the actual temperature is 150° F., this calls for a correction of 15°. FIG. 3a shows the plot of error vs. time and FIG. 3b shows the state of the mixing valve vs. time. As shown in FIG. 3a, after the initial correction has been computed to, the computer calculates the initial activation of the valve motor to step same for one second for the first five degrees of correction and one second for each degree thereafter up to a maximum of 15°. Thus for a correction of 15°, the activation lasts between $T_0$ and $T_1$ which is eleven seconds. After the initial eleven seconds, the motor idles for 30 seconds until the time $T_2$ while the computer recalculates, checking on the comparative temperatures. If no correction is to be made, then the computer will again recalculate during the next 30 second idling period and again if another correction is to be made.

For the example shown after the correction, a −12° correction is calculated at $T_3$ requiring the motorized valve to close for 7 seconds. During another idling period $T_3$ to $T_4$, a −7° error is computed necessitating the valve opening for 3 sec. Thereafter, the correction is recomputed during time $T_5$ to $T_6$ which has a duration of 30 seconds whereupon the new correction of −3° F. is determined. Since the correction is less than 50°, the valve is kept open for 1 second during $T_6$-$T_7$. The next correction computed between $T_7$ and $T_8$ is +20 F., which is within the system tolerence and thus no correction is to be made to $T_8$ and the valve will idle until $T_9$ where a correction of +5° F. has been computed. The valve is now opened for 1 second during $T_9$-$T_{10}$ and the correction recomputed between $T_{10}$ and $T_{11}$. Again a 5° F. correction results in the valve open for 1 second from $T_{11}$-$T_{12}$.

The device continuously repeats this process as shown at $T_{12}$ to $T_{15}$ and so on. The process is repeated to see if the two temperatures again diverge and thus necessitate correction. All corrections of the water temperature are arrived at by the digital damping procedure whether the need is for increasing or reducing the actual water temperature.

Figure 6:
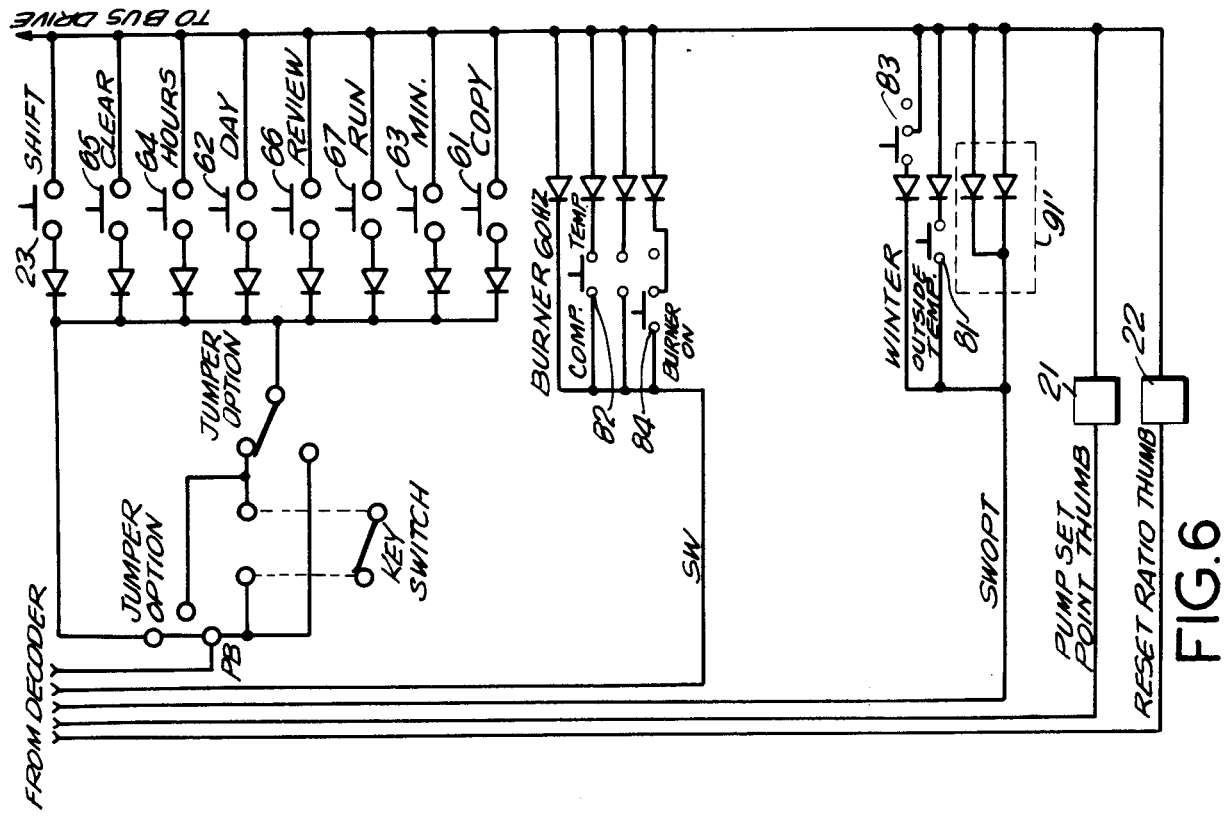
FIG. 6 is a detailed circuitry for the control panel switch inputs of FIG. 4.
Figure 5:
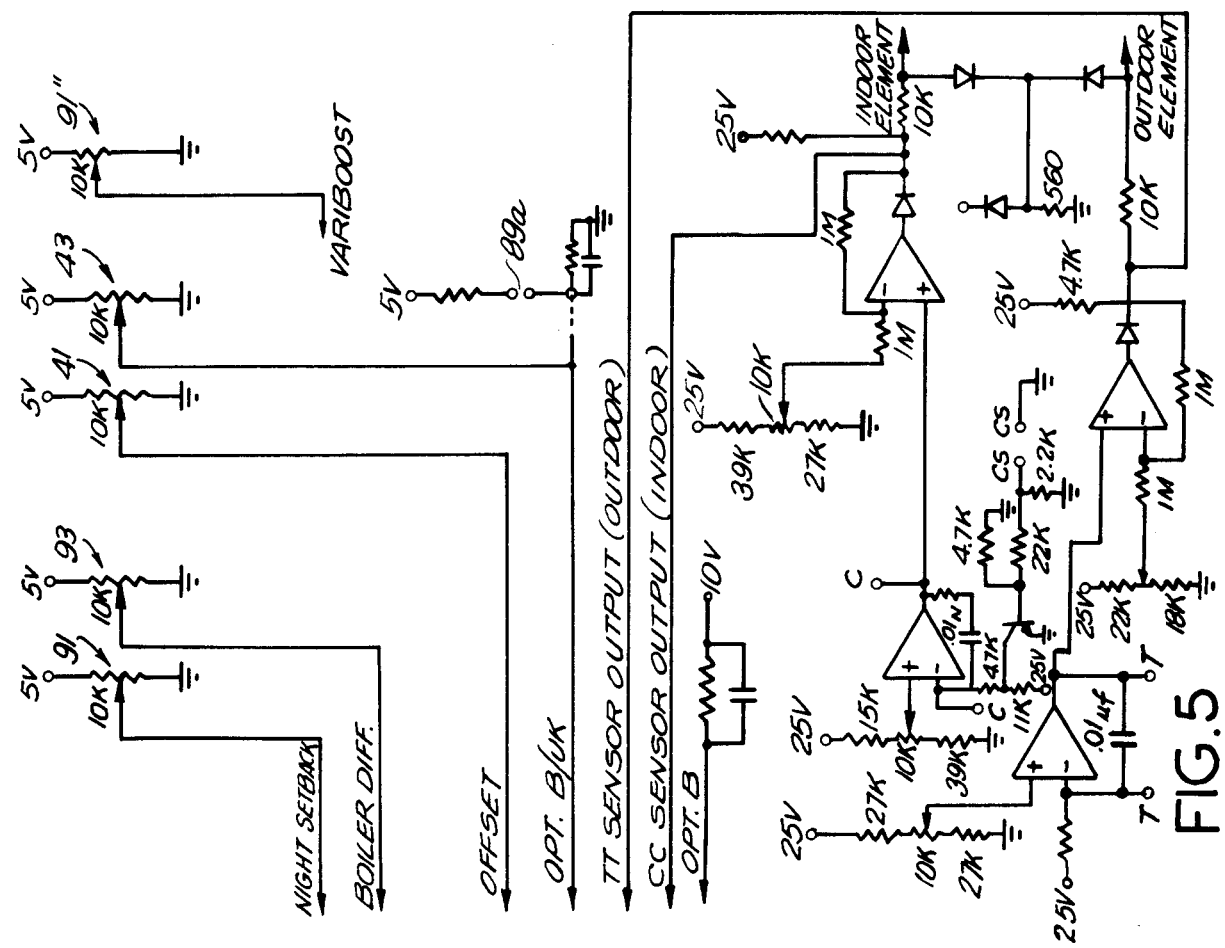
FIG. 5 is a detailed schematic of the circuitry for the sensor inputs and control settings of FIG. 4.

Referring now to FIGS. 4–6, the circuitry for effecting the functions set forth hereinbefore are disclosed in more detail.

The device is powered by a main power supply 171 which receives a line voltage from an AC source. The output of the main power supply 171 is fed to a power sensor 172 which feeds microprocessor 100, clock generator 174 and all of the other circuitry included in the device. The power sensor senses if the power supply 171 is operational, and if not, it cuts in auxiliary battery power supply 173 so that the circuitry does not go down during the loss of the AC supply. The clock generator 174 generates the clock signals necessary to operate the system according to its specification. Also included is a program interrupt 175 which enables the system to be interrupted during use for servicing and the like.

The main control network of he device according to the present invention is the microprocessor 100 connected in a conventional configuration with an 8-bit bus driver 115 and in communication with a 16-bit latch address network 115 and ROM 120 and 3 RAM memories 125, 130 and 135 connected as shown. The microprocessor 100 feeds three control bits to decoder 110 which, on the basis of these bits, outputs 5 interrogation signals TB, W, SWOPT, Day Thumb and Night Thumb, as shown in FIG. 5 to interrogate the status of the control panel switch inputs heretofore described. The decoder also generates five strobe signals strobe 1-5 which are used to direct the storage of data from the bus drive 105 to latches 140, 145, 150, 155 and 160.

The data on the bus which is controlled by microprocessor 100 is displayed as follows:

The 8-bit segment latch 140 received data from the data bus and upon the strobing by strobe 1, the data is stored in the latch 140. The digit data is supplied via the bus drive 105 to 8-bit digit latch 145 which data is entered therein by strobe 2. Upon the strobing of data into latches 140 and 145, the segment and digit drive 141 and 146 feed display 52, 53 to display the data therein.

The other control lights and relays are displayed and controlled via the 8-bit control latch 150 whose data is strobed in by strobe 3 and driven by control drive 151 so as to be indicated by the control lights and relays 152.

The determination of the levels and control settings shown in FIG. 5 and illustrated in FIG. 4 as block 180, are analyzed by the microprocessor by means of the analog multiplex latch 160 which stores 3 bits of data to select one of eight inputs on analog multiplexor 165 which is fed by the sensor inputs and control settings 180. Multiplexor 165 selects one of eight signals and inputs it to comparator 170. The microprocessor then determines the level of the data by incrementing the 8-bit ladder latch 155 via strobe 4 and driving the output thereof through drive 156 to a ladder network 157. The ladder network 157 generates a stepwise ladder which is fed into the comparator and which is fed back to the microprocessor when a favorable comparison is made thus indicating to the comparator that the data in the 8-bit latch 155 is equal to the sensor input or control setting then under consideration. The circuitry shown in FIG. 5 is conventional and provides for a processing of the sensor signals for use by the analog multiplexor.

FIG. 6 shows the block 190 which receives the interrogation outputs from decoder 110 which feeds the status of the switches and control panel settings to the bus drive for processing by the microprocessor 100.

In a particular advantageous embodiment, the microprocessor 100 is an RCA 1802 microprocessor and the bus drive 105 comprises a TI 374 latch drive units. The latch 114 for the address is a TI 374 latch as are latches 140, 145, 150, 155 and 160. The ROM 120 is an AMI 9332 while RAM 125 is an RCA 1825 and RAMs 130 and 135 are AMI 5101 circuits.

The segment drive 141 is a Sprague 2800 as is control drive 151, while the digit drive 146 is s Sprague 2480. The ladder drive 156 is an RCA CD 4050 and the analog multiplexor 165 is an RCA 4051. The analog multiplex latch 160 is a 174 and the decoder 110 is a TI 7442. The comparator is a conventional operational amplifier in the most advantageous embodiment.

The microprocessor program for carrying out the aforementioned functions is set forth in the following printout listing thereof and it will be immediately recognizable by those skilled in the art that the entire operation of the device as set forth above can be achieved as a result of this step-by-step execution.

```
10      EQU     CELBIT,&H80
20      EQU     NCELBIT,&H7F
30      EQU     T4HR,&H20
40      EQU     UK,&H20
50      EQU     BURNBIT,&H20
60      EQU     NBURNBIT,&HDF
70      EQU     RANGE5,&H8
80      EQU     NRANGE5,&HF7
90      EQU     HTOK,&H40
100     EQU     NHTOK,&HBF
110     EQU     SYNC,&HE
120     EQU     VLVDLY,&H80
130     EQU     VLVDLYB,&H80
140     EQU     AHPM,&HCF
150     EQU     COLONBIT,&H2
160     EQU     NCOLONBIT,&HFD
170     EQU     VLVTMR,&H6
180     EQU     NAUXBIT,&HFE
190     EQU     ONE,&HF3
200     EQU     AUXSET,&H10
210     EQU     COINBIT,&H4
220     EQU     NCOINBIT,&HFB
230     EQU     CEL,&H20
240     EQU     INT,&H1
250     EQU     RAM,&H3000
260     EQU     SF,&H2
270     EQU     PC,&H3
280     EQU     SUB,&H4
290     EQU     SUBSUB,&H5
300     EQU     DISFNT,&HF
310     EQU     UTILP1,&HE
320     EQU     HZCNTR,&HD
330     EQU     TEMF,&H0
340     EQU     UTIL,&HF
350     EQU     UTILP2,&HA
360     EQU     CRAM,&HA000
370     EQU     MANUAL,&H8
380     EQU     STACK,&HA018
390     EQU     OUTMSK,&H3A
400     EQU     CONTR,&H6
410     EQU     DISFL,&H6
420     EQU     SEGPT,&H2
430     EQU     DISF,&HA005
440     EQU     HZMSK,&H80
450     EQU     NHZMSK,&H7F
460     EQU     BMSK,&H40
470     EQU     BUTMR,&H7
480     EQU     NBMSK,&HBF
490     EQU     SW,&H6
500     EQU     HZ,&H20
510     EQU     FLAG,&H8
520     EQU     PEEKMSK,&H10
530     EQU     NPMPMSK,&HEF
540     EQU     RSTMR,&HC
550     EQU     INF,&H1
560     EQU     NINF,&HFE
570     EQU     INFC,&H2
580     EQU     NINFC,&HFD
590     EQU     NINFIC,&HDC
600     EQU     TIME,&H30E0
610     EQU     INFIC,&H3
620     EQU     AUTMSK,&H2
630     EQU     NITMSK,&HF7
640     EQU     SWOPT,&H1
```

|  |  | 650 | EQU | AUXBIT,&H1 |
|---|---|---|---|---|
|  |  | 660 | EQU | ANASW,&H4 |
|  |  | 670 | EQU | TGT,&HA000 |
|  |  | 680 | EQU | MQ,&H9 |
|  |  | 690 | EQU | BSTMSK,&HFE |
|  |  | 700 | EQU | NBURNFLG,&H4 |
|  |  | 710 | EQU | BURNFLG,&H4 |
|  |  | 720 | EQU | FB,&H5 |
|  |  | 730 | EQU | PGMSK,&H4 |
|  |  | 740 | EQU | SMSK,&H20 |
|  |  | 750 | EQU | CCRMSK,&H89 |
|  |  | 760 | EQU | CLMSK,&H80 |
|  |  | 770 | EQU | CMSK,&H1 |
|  |  | 780 | EQU | RDHMSK,&H7A |
|  |  | 790 | EQU | RMSK,&H8 |
|  |  | 800 | EQU | DHMSK,&H72 |
|  |  | 810 | EQU | HMSK,&H40 |
|  |  | 820 | EQU | MMSK,&H2 |
|  |  | 830 | EQU | VE,&HD |
|  |  | 840 | EQU | VN,&HE |
|  |  | 850 | EQU | VO,&HO |
|  |  | 860 | EQU | FM,&HEF |
|  |  | 870 | EQU | AM,&HDF |
|  |  | 880 | EQU | COL,&HFD |
|  |  | 890 | EQU | IND,&H4 |
|  |  | 900 | EQU | NCLSFLG,&HF7 |
|  |  | 910 | EQU | BURNSW,&H4 |
|  |  | 920 | EQU | CLSFLG,&H8 |
|  |  | 930 | EQU | VLVPOT,&HFC |
|  |  | 940 | EQU | FTMSK,&HFD |
|  |  | 950 | EQU | ITMSK,&HF5 |
|  |  | 960 | EQU | OTMSK,&HFF |
|  |  | 970 | EQU | REMPOT,&HF6 |
|  |  | 980 | EQU | DIFCMSK,&HF4 |
|  |  | 990 | EQU | RIOWL,&H4 |
|  |  | 1000 | EQU | FMFWL,&H2 |
|  |  | 1010 | EQU | LADDER,&H5 |
|  |  | 1020 | EQU | DIGPT,&H3 |
|  |  | 1030 | EQU | DMSK,&H10 |
|  |  | 1040 | EQU | SGN,&HFE |
|  |  | 1050 | EQU | FMFMSK,&H10 |
|  |  | 1060 | EQU | TEMPIN,&HA002 |
|  |  | 1070 | EQU | TEMPOUT,&HA003 |
|  |  | 1080 | EQU | H1.5H,&HC |
|  |  | 1090 | EQU | DAY3,&H30E4 |
|  |  | 1100 | EQU | OPNFLG,&H20 |
|  |  | 1110 | EQU | OCF,&H28 |
|  |  | 1120 | EQU | NOCF,&HD7 |
|  |  | 1130 | EQU | NOPNFLG,&HDF |
|  |  | 1140 | EQU | OPT,&H1 |
|  |  | 1150 | EQU | RAM2,&H6000 |
|  |  | 1160 | EQU | WINTER,&H8 |
|  |  | 1170 | EQU | TENMIN,&H40 |
| 0000 | 71 | 1180 | DIS |  |
| 0001 | 00 | 1190 | DB | #0 |
| 0002 | F830 | 1200 | LDI | A.1/RAM |
| 0004 | BE | 1210 | PHI | UTILP1 |
| 0005 | F800 | 1220 | LDI | #0 |
| 0007 | AE | 1230 | PLO | UTILP1 |
| 0008 | 4E | 1240 | MEMCK  LDA | UTILP1 |
| 0009 | FF06 | 1250 | SMI | #.10 |
| 000B | 3323 | 1260 | BDF | CLEAR |
| 000D | 4E | 1270 | LDA | UTILP1 |
| 000E | FF06 | 1280 | SMI | #6 |
| 0010 | 3323 | 1290 | BDF | CLEAR |
| 0012 | 4E | 1300 | LDA | UTILP1 |
| 0013 | FF0D | 1310 | SMI | #.13 |

| | | | | |
|---|---|---|---|---|
| 0015 | 3323 | 1320 | BDF | CLEAR |
| 0017 | 4E | 1330 | LDA | UTILP1 |
| 0018 | FF02 | 1340 | SMI | #2 |
| 001A | 3323 | 1350 | BDF | CLEAR |
| 001C | 8E | 1360 | GLO | UTILP1 |
| 001D | FBE0 | 1370 | XRI | #E0 |
| 001F | 3A08 | 1380 | BNZ | MEMCK |
| 0021 | 304C | 1390 | BR | RESTRT |
| 0023 | F8FF | 1400 | CLEAR  LDI | A.0/RAM2,+&HFF |
| 0025 | AE | 1410 | PLO | UTILP1 |
| 0026 | F860 | 1420 | LDI | A.1/RAM2,+&HFF |
| 0028 | BE | 1430 | PHI | UTILP1 |
| 0029 | EE | 1440 | SEX | UTILP1 |
| 002A | F800 | 1450 | LDI | #0 |
| 002C | 73 | 1460 | STXD | |
| 002D | 9E | 1470 | GHI | UTILP1 |
| 002E | FA01 | 1480 | ANI | #1 |
| 0030 | 322A | 1490 | BZ | *,-6 |
| 0032 | F830 | 1500 | LDI | A.1/RAM |
| 0034 | BE | 1510 | PHI | UTILP1 |
| 0035 | F800 | 1520 | LDI | #0 |
| 0037 | 73 | 1530 | STXD | |
| 0038 | 9E | 1540 | GHI | UTILP1 |
| 0039 | FA01 | 1550 | ANI | #1 |
| 003B | 3235 | 1560 | BZ | *,-6 |
| 003D | F8C4 | 1570 | LDI | #.196 |
| 003F | AD | 1580 | PLO | HZCNTR |
| 0040 | BD | 1590 | PHI | HZCNTR |
| 0041 | F803 | 1600 | LDI | INFIC |
| 0043 | A8 | 1610 | PLO | FLAG |
| 0044 | F805 | 1620 | LDI | #.5 |
| 0046 | B6 | 1630 | PHI | VLVTMR |
| 0047 | F800 | 1640 | LDI | #0 |
| 0049 | AC | 1650 | PLO | RSTMR |
| 004A | BC | 1660 | PHI | H1.5H |
| 004B | B8 | 1670 | PHI | FLAG |
| 004C | F853 | 1680 | RESTRT  LDI | A.0/START |
| 004E | A3 | 1690 | PLO | PC |
| 004F | F800 | 1700 | LDI | A.1/START |
| 0051 | B3 | 1710 | PHI | PC |
| 0052 | D3 | 1720 | SEP | PC |
| 0053 | F8D7 | 1730 | START  LDI | A.0/FWDN |
| 0055 | A1 | 1740 | PLO | INT |
| 0056 | F80A | 1750 | LDI | A.1/FWDN |
| 0058 | B1 | 1760 | PHI | INT |
| 0059 | E3 | 1770 | SEX | PC |
| 005A | 70 | 1780 | RET | |
| 005B | 33 | 1790 | DT | &H33 |
| 005C | F8C1 | 1800 | LDI | #1 |
| 005E | A6 | 1810 | PLO | DISPL |
| 005F | BB | 1820 | PHI | SYNC |
| 0060 | F8E0 | 1830 | LDI | A.0/TIME |
| 0062 | AF | 1840 | PLO | RF |
| 0063 | F830 | 1850 | LDI | A.1/TIME |
| 0065 | BF | 1860 | PHI | RF |
| 0066 | F818 | 1870 | LDI | A.0/STACK |
| 0068 | A2 | 1880 | PLO | SP |
| 0069 | F8A0 | 1890 | LDI | A.1/STACK |
| 006B | B2 | 1900 | PHI | SP |
| 006C | 66 | 1910 | OUT | CONTR |
| 006D | FF | 1920 | DT | &HFF |
| 006E | 98 | 1930 | GHI | FLAG |
| 006F | F904 | 1940 | ORI | COINBIT |
| 0071 | B8 | 1950 | PHI | FLAG |
| 0072 | 7A | 1960 | REQ | |
| 0073 | F8E2 | 1970 | LDI | A.0/TIME,+2 |
| 0075 | AE | 1980 | PLO | UTILP1 |
| 0076 | F830 | 1990 | LDI | A.1/TIME,+2 |

| | | | | | |
|---|---|---|---|---|---|
| 0078 | BE | | 2000 | | PHI UTILP1 |
| 0079 | 0E | | 2010 | | LDN UTILP1 |
| 007A | C2014A | | 2020 | | LBZ DISPLAY,+1 |
| 007D | 1E | | 2030 | | INC UTILP1 |
| 007E | 1E | | 2040 | | INC UTILP1 |
| 007F | F830 | | 2050 | | LDI A.1/RAM |
| 0081 | BA | | 2060 | | PHI UTILP2 |
| 0082 | 0E | | 2070 | | LDN UTILP1 |
| 0083 | F6 | | 2080 | | SHR |
| 0084 | 76 | | 2090 | | SHRC |
| 0085 | 76 | | 2100 | | SHRC |
| 0086 | 76 | | 2110 | | SHRC |
| 0087 | F91F | | 2120 | | ORI #1F |
| 0089 | AA | | 2130 | | PLO UTILP2 |
| 008A | F800 | | 2140 | RUN2 | LDI #0 |
| 008C | A9 | | 2150 | | PLO MQ |
| 008D | B9 | | 2160 | | PHI MQ |
| 008E | F8E3 | | 2170 | NEW | LDI A.0/TIME,+3 |
| 0090 | AE | | 2180 | | PLO UTILP1 |
| 0091 | 8A | | 2190 | | GLO UTILP2 |
| 0092 | F903 | | 2200 | | ORI #3 |
| 0094 | AA | | 2210 | | PLO UTILP2 |
| 0095 | 2A | | 2220 | | DEC UTILP2 |
| 0096 | 0A | | 2230 | | LDN UTILP2 |
| 0097 | C20122 | | 2240 | | LBZ NST |
| 009A | 1A | | 2250 | | INC UTILP2 |
| 009B | EE | | 2260 | ND | SEX UTILP1 |
| 009C | 8A | | 2270 | | GLO UTILP2 |
| 009D | FA03 | | 2280 | | ANI #3 |
| 009F | FB02 | | 2290 | | XRI #2 |
| 00A1 | 3AB2 | | 2300 | | BNZ NHRS |
| 00A3 | 0E | | 2310 | | LDN UTILP1 |
| 00A4 | FF0C | | 2320 | | SMI #.12 |
| 00A6 | CF | | 2330 | | LSDF |
| 00A7 | FC0C | | 2340 | | ADI #.12 |
| 00A9 | 52 | | 2350 | | STR SP |
| 00AA | E2 | | 2360 | | SEX SP |
| 00AB | 0A | | 2370 | | LDN UTILP2 |
| 00AC | FF0C | | 2380 | | SMI #.12 |
| 00AE | CF | | 2390 | | LSDF |
| 00AF | FC0C | | 2400 | | ADI #.12 |
| 00B1 | 38 | | 2410 | | SKP |
| 00B2 | 0A | | 2420 | NHRS | LDN UTILP2 |
| 00B3 | F5 | | 2430 | | SD |
| 00B4 | CB0122 | | 2440 | | LBNF NST |
| 00B7 | 3AC3 | | 2450 | | BNZ GOOD1 |
| 00B9 | 2E | | 2460 | | DEC UTILP1 |
| 00BA | 2A | | 2470 | | DEC UTILP2 |
| 00BB | 8A | | 2480 | | GLO UTILP2 |
| 00BC | FA03 | | 2490 | | ANI #3 |
| 00BE | FB03 | | 2500 | | XRI #3 |
| 00C0 | 3A9B | | 2510 | | BNZ ND |
| 00C2 | 1A | | 2520 | | INC UTILP2 |
| 00C3 | 99 | | 2530 | GOOD1 | GHI MQ |
| 00C4 | 32F2 | | 2540 | | BZ GOOD2 |
| 00C6 | 8A | | 2550 | | GLO UTILP2 |
| 00C7 | F903 | | 2560 | | ORI #3 |
| 00C9 | AA | | 2570 | | PLO UTILP2 |
| 00CA | EA | | 2580 | ND2 | SEX UTILP2 |
| 00CB | 89 | | 2590 | | GLO MQ |
| 00CC | FA03 | | 2600 | | ANI #3 |
| 00CE | FB02 | | 2610 | | XRI #2 |
| 00D0 | 3AE1 | | 2620 | | BNZ NHRS2 |
| 00D2 | 0A | | 2630 | | LDN UTILP2 |
| 00D3 | FF0C | | 2640 | | SMI #.12 |
| 00D5 | CF | | 2650 | | LSDF |
| 00D6 | FC0C | | 2660 | | ADI #.12 |
| 00D8 | 52 | | 2670 | | STR SP |

| | | | | | |
|---|---|---|---|---|---|
| 00D9 | E2 | 2680 | | SEX | SP |
| 00DA | 09 | 2690 | | LDN | MQ |
| 00DB | FF0C | 2700 | | SMI | #.12 |
| 00DD | CF | 2710 | | LSDF | |
| 00DE | FC0C | 2720 | | ADI | #.12 |
| 00E0 | 38 | 2730 | | SKP | |
| 00E1 | 09 | 2740 | NHRS2 | LDN | MQ |
| 00E2 | F5 | 2750 | | SD | |
| 00E3 | CB0122 | 2760 | | LBNF | NST |
| 00E6 | 3AF2 | 2770 | | BNZ | GOOD2 |
| 00E8 | 2A | 2780 | | DEC | UTILP2 |
| 00E9 | 29 | 2790 | | DEC | MQ |
| 00EA | 89 | 2800 | | GLO | MQ |
| 00EB | FA03 | 2810 | | ANI | #3 |
| 00ED | FB03 | 2820 | | XRI | #3 |
| 00EF | 3ACA | 2830 | | BNZ | ND2 |
| 00F1 | 1A | 2840 | | INC | UTILP2 |
| 00F2 | 9A | 2850 | GOOD2 | GHI | UTILP2 |
| 00F3 | B9 | 2860 | | PHI | MQ |
| 00F4 | 8A | 2870 | | GLO | UTILP2 |
| 00F5 | A9 | 2880 | | PLO | MQ |
| 00F6 | C00122 | 2890 | | LBR | NST |
| 00F9 | C10103 | 2900 | CDAY | LBQ | CCLS |
| 00FC | 88 | 2910 | | GLO | FLAG |
| 00FD | F903 | 2920 | | ORI | DNFIC |
| 00FF | A8 | 2930 | | PLO | FLAG |
| 0100 | C00142 | 2940 | | LBR | CAUX |
| 0103 | 98 | 2950 | CCLS | GHI | FLAG |
| 0104 | F901 | 2960 | | ORI | AUXBIT |
| 0106 | B8 | 2970 | | PHI | FLAG |
| 0107 | 304A | 2980 | | BR | DISPLAY,+1 |
| 0109 | 311C | 2990 | CNIT | BQ | COFN |
| 010B | 8C | 3000 | | GLO | RSTMR |
| 010C | CA00F9 | 3010 | | LBNZ | CDAY |
| 010F | 88 | 3020 | | GLO | FLAG |
| 0110 | FAFE | 3030 | | ANI | NDNF |
| 0112 | A8 | 3040 | | PLO | FLAG |
| 0113 | 9C | 3050 | | GHI | H1.5H |
| 0114 | 3A42 | 3060 | | BNZ | CAUX |
| 0116 | 88 | 3070 | | GLO | FLAG |
| 0117 | FADC | 3080 | | ANI | NDNFIC |
| 0119 | A8 | 3090 | | PLO | FLAG |
| 011A | 3042 | 3100 | | BR | CAUX |
| 011C | 98 | 3110 | COFN | GHI | FLAG |
| 011D | FAFE | 3120 | | ANI | NAUXBIT |
| 011F | B8 | 3130 | | PHI | FLAG |
| 0120 | 304A | 3140 | | BR | DISPLAY,+1 |
| 0122 | 8A | 3150 | NST | GLO | UTILP2 |
| 0123 | F903 | 3160 | | ORI | #3 |
| 0125 | FF04 | 3170 | | SMI | #4 |
| 0127 | AA | 3180 | | PLO | UTILP2 |
| 0128 | FA1C | 3190 | | ANI | #1C |
| 012A | FB1C | 3200 | | XRI | #1C |
| 012C | 1A | 3210 | | INC | UTILP2 |
| 012D | 3237 | 3220 | | BZ | SWTC |
| 012F | 89 | 3230 | | GLO | MQ |
| 0130 | F903 | 3240 | | ORI | #3 |
| 0132 | A9 | 3250 | | PLO | MQ |
| 0133 | 2A | 3260 | | DEC | UTILP2 |
| 0134 | C0008E | 3270 | | LBR | NEW |
| 0137 | 99 | 3280 | SWTC | GHI | MQ |
| 0138 | 3209 | 3290 | | BZ | CNIT |
| 013A | 89 | 3300 | | GLO | MQ |
| 013B | FA04 | 3310 | | ANI | #4 |
| 013D | 3A09 | 3320 | | BNZ | CNIT |
| 013F | C000F9 | 3330 | | LBR | CDAY |
| 0142 | 7B | 3340 | CAUX | SEQ | |
| 0143 | F860 | 3350 | | LDI | A.1/RAM2 |

| | | | | |
|---|---|---|---|---|
| 0145 | BA | 3360 | | PHI | UTILP2 |
| 0146 | C0008A | 3370 | | LBR | RUN2 |
| 0149 | D4 | 3380 | DISPLAY | SEP | SUB |
| 014A | E2 | 3390 | | SEX | SP |
| 014B | 26 | 3400 | | DEC | DISPL |
| 014C | 86 | 3410 | | GLO | DISPL |
| 014D | 3A5C | 3420 | | BNZ | NEXD |
| 014F | F808 | 3430 | | LDI | #8 |
| 0151 | A6 | 3440 | | PLO | DISPL |
| 0152 | F8DB | 3450 | | LDI | A.0/MEASURE |
| 0154 | A4 | 3460 | | PLO | SUB |
| 0155 | F806 | 3470 | | LDI | A.1/MEASURE |
| 0157 | B4 | 3480 | | PHI | SUB |
| 0158 | 9B | 3490 | | GHI | SYNC |
| 0159 | FC01 | 3500 | | ADI | #1 |
| 015B | BB | 3510 | | PHI | SYNC |
| 015C | F8FF | 3520 | NEXD | LDI | #FF |
| 015E | 52 | 3530 | | STR | SP |
| 015F | 62 | 3540 | | OUT | SEGPT |
| 0160 | 22 | 3550 | | DEC | SP |
| 0161 | 86 | 3560 | | GLO | DISPL |
| 0162 | FCA4 | 3570 | | ADI | A.0/SCANCHT,-1 |
| 0164 | AE | 3580 | | PLO | UTILP1 |
| 0165 | F800 | 3590 | | LDI | #0 |
| 0167 | 7C0D | 3600 | | ADCI | A.1/SCANCHT,-1 |
| 0169 | BE | 3610 | | PHI | UTILP1 |
| 016A | EE | 3620 | | SEX | UTILP1 |
| 016B | 63 | 3630 | | OUT | DIGPT |
| 016C | 86 | 3640 | | GLO | DISPL |
| 016D | FC04 | 3650 | | ADI | A.0/DISP,-1 |
| 016F | AE | 3660 | | PLO | UTILP1 |
| 0170 | F8A0 | 3670 | | LDI | A.1/DISP,-1 |
| 0172 | BE | 3680 | | PHI | UTILP1 |
| 0173 | 62 | 3690 | | OUT | SEGPT |
| 0174 | E2 | 3700 | HZCNT | SEX | SP |
| 0175 | 3F7E | 3710 | | BN4 | *,+9 |
| 0177 | 88 | 3720 | | GLO | FLAG |
| 0178 | FA7F | 3730 | | ANI | NHZMSK |
| 017A | A8 | 3740 | | PLO | FLAG |
| 017B | C00149 | 3750 | | LBR | DISPLAY |
| 017E | 88 | 3760 | | GLO | FLAG |
| 017F | FA80 | 3770 | | ANI | HZMSK |
| 0181 | CA0149 | 3780 | | LBNZ | DISPLAY |
| 0184 | 88 | 3790 | | GLO | FLAG |
| 0185 | F980 | 3800 | | ORI | HZMSK |
| 0187 | A8 | 3810 | | PLO | FLAG |
| 0188 | FA40 | 3820 | | ANI | BMSK |
| 018A | C6 | 3830 | | LSNZ | |
| 018B | 3093 | 3840 | | BR | *,+8 |
| 018D | 97 | 3850 | | GHI | BUTMR |
| 018E | C6 | 3860 | | LSNZ | |
| 018F | F837 | 3870 | | LDI | #.55 |
| 0191 | FF01 | 3880 | | SMI | #1 |
| 0193 | B7 | 3890 | | PHI | BUTMR |
| 0194 | 3A9A | 3900 | | BNZ | *,+6 |
| 0196 | 88 | 3910 | | GLO | FLAG |
| 0197 | FABF | 3920 | | ANI | NBMSK |
| 0199 | A8 | 3930 | | PLO | FLAG |
| 019A | 1D | 3940 | | INC | HZCNTR |
| 019B | 8D | 3950 | AFTCON | GLO | HZCNTR |
| 019C | CA0149 | 3960 | | LBNZ | DISPLAY |
| 019F | 6E | 3970 | | INP | SW |
| 01A0 | FA20 | 3980 | | ANI | HZ |
| 01A2 | C201A8 | 3990 | | LBZ | *,+6 |
| 01A5 | F8CE | 4000 | | LDI | #.206 |
| 01A7 | C8 | 4010 | | LSKP | |
| 01A8 | F8C4 | 4020 | | LDI | #.196 |
| 01AA | AD | 4030 | | PLO | HZCNTR |

| | | | | |
|---|---|---|---|---|
| 01AB | 96 | 4040 | GHI | VLVTMR |
| 01AC | CE | 4050 | LSZ | |
| 01AD | FF01 | 4060 | SMI | #1 |
| 01AF | B6 | 4070 | PHI | VLVTMR |
| 01B0 | 69 | 4080 | INP | SWOPT |
| 01B1 | FA20 | 4090 | ANI | CEL |
| 01B3 | 32BA | 4100 | BZ | NDC |
| 01B5 | 98 | 4110 | GHI | FLAG |
| 01B6 | F980 | 4120 | ORI | CELBIT |
| 01B8 | 30BD | 4130 | BR | ONEMIN,-1 |
| 01BA | 98 | 4140 | NDC GHI | FLAG |
| 01BB | FA7F | 4150 | ANI | NCELBIT |
| 01BD | B8 | 4160 | PHI | FLAG |
| 01BE | E2 | 4170 | ONEMIN SEX | SP |
| 01BF | 9D | 4180 | GHI | HZCNTR |
| 01C0 | CA0149 | 4190 | LBNZ | DISPLAY |
| 01C3 | 98 | 4200 | GHI | FLAG |
| 01C4 | F904 | 4210 | ORI | COINBIT |
| 01C6 | B8 | 4220 | PHI | FLAG |
| 01C7 | 8C | 4230 | BSTIM GLO | BSTMR |
| 01C8 | C201CC | 4240 | LBZ | BSTEND |
| 01CB | 2C | 4250 | DEC | BSTMR |
| 01CC | F8C4 | 4260 | BSTEND LDI | #.196 |
| 01CE | BD | 4270 | PHI | HZCNTR |
| 01CF | F8E2 | 4280 | MININC LDI | A.0/TIME,+2 |
| 01D1 | AE | 4290 | PLO | UTILP1 |
| 01D2 | F830 | 4300 | LDI | A.1/TIME |
| 01D4 | BE | 4310 | PHI | UTILP1 |
| 01D5 | 0E | 4320 | LDN | UTILP1 |
| 01D6 | C201ED | 4330 | LBZ | IEX |
| 01D9 | 2E | 4340 | DEC | UTILP1 |
| 01DA | 2E | 4350 | DEC | UTILP1 |
| 01DB | F856 | 4360 | LDI | A.0/INCMIN |
| 01DD | A5 | 4370 | PLO | SUBSUB |
| 01DE | F80D | 4380 | LDI | A.1/INCMIN |
| 01E0 | B5 | 4390 | PHI | SUBSUB |
| 01E1 | 24 | 4400 | DEC | SUB |
| 01E2 | D5 | 4410 | SEP | SUBSUB |
| 01E3 | CB01ED | 4420 | LBNF | IEX |
| 01E6 | 24 | 4430 | DEC | SUB |
| 01E7 | D5 | 4440 | SEP | SUBSUB |
| 01E8 | CB01ED | 4450 | LBNF | IEX |
| 01EB | 24 | 4460 | DEC | SUB |
| 01EC | D5 | 4470 | SEP | SUBSUB |
| 01ED | 9C | 4480 | IEX GHI | H1.5H |
| 01EE | 32F3 | 4490 | BZ | TEX |
| 01F0 | FF01 | 4500 | SMI | #1 |
| 01F2 | BC | 4510 | PHI | H1.5H |
| 01F3 | C00149 | 4520 | TEX LBR | DISPLAY |
| 01F6 | E2 | 4530 | SUBSTART SEX | SP |
| 01F7 | 9C | 4540 | GHI | H1.5H |
| 01F8 | CA0209 | 4550 | LBNZ | DEX |
| 01FB | 8C | 4560 | GLO | BSTMR |
| 01FC | CA0209 | 4570 | LBNZ | DEX |
| 01FF | 88 | 4580 | GLO | FLAG |
| 0200 | FA01 | 4590 | ANI | DNF |
| 0202 | CA0209 | 4600 | LBNZ | DEX |
| 0205 | 88 | 4610 | GLO | FLAG |
| 0206 | FAFD | 4620 | ANI | NDNFC |
| 0208 | A8 | 4630 | PLO | FLAG |
| 0209 | F808 | 4640 | DEX LDI | #8 |
| 020B | A0 | 4650 | PLO | TEMP |
| 020C | 88 | 4660 | GLO | FLAG |
| 020D | FA02 | 4670 | ANI | DNFC |
| 020F | C6 | 4680 | LSNZ | |
| 0210 | 80 | 4690 | GLO | TEMP |
| 0211 | C8 | 4700 | LSKP | |
| 0212 | F804 | 4710 | LDI | #4 |

| | | | | | |
|---|---|---|---|---|---|
| 0214 | 52 | 4720 | | STR | SF |
| 0215 | 88 | 4730 | | GLO | FLAG |
| 0216 | FA10 | 4740 | | ANI | PMPMSK |
| 0218 | CE | 4750 | | LSZ | |
| 0219 | F801 | 4760 | | LDI | #1 |
| 021B | F1 | 4770 | | OR | |
| 021C | 52 | 4780 | | STR | SF |
| 021D | 98 | 4790 | | GHI | FLAG |
| 021E | FA20 | 4800 | | ANI | BURNBIT |
| 0220 | CE | 4810 | | LSZ | |
| 0221 | F840 | 4820 | | LDI | #40 |
| 0223 | F1 | 4830 | | OR | |
| 0224 | 52 | 4840 | | STR | SF |
| 0225 | 88 | 4850 | | GLO | FLAG |
| 0226 | FA08 | 4860 | | ANI | CLSFLG |
| 0228 | CE | 4870 | | LSZ | |
| 0229 | F880 | 4880 | | LDI | #80 |
| 022B | F1 | 4890 | | OR | |
| 022C | 52 | 4900 | | STR | SF |
| 022D | 88 | 4910 | | GLO | FLAG |
| 022E | FA20 | 4920 | | ANI | OPNFLG |
| 0230 | CE | 4930 | | LSZ | |
| 0231 | F802 | 4940 | | LDI | #2 |
| 0233 | F1 | 4950 | | OR | |
| 0234 | 52 | 4960 | | STR | SF |
| 0235 | 98 | 4970 | | GHI | FLAG |
| 0236 | FA01 | 4980 | | ANI | AUXBIT |
| 0238 | CE | 4990 | | LSZ | |
| 0239 | F810 | 5000 | | LDI | #10 |
| 023B | F1 | 5010 | | OR | |
| 023C | 52 | 5020 | | STR | SF |
| 023D | 8C | 5030 | | GLO | RSTMR |
| 023E | CE | 5040 | | LSZ | |
| 023F | F820 | 5050 | | LDI | #20 |
| 0241 | F1 | 5060 | | OR | |
| 0242 | FBFF | 5070 | | XRI | #FF |
| 0244 | A0 | 5080 | | PLO | TEMP |
| 0245 | 69 | 5090 | | INP | SWOPT |
| 0246 | FA08 | 5100 | | ANI | WINTER |
| 0248 | FB08 | 5110 | | XRI | WINTER |
| 024A | CE | 5120 | | LSZ | |
| 024B | F820 | 5130 | | LDI | #20 |
| 024D | 52 | 5140 | | STR | SF |
| 024E | 80 | 5150 | | GLO | TEMP |
| 024F | F1 | 5160 | | OR | |
| 0250 | 52 | 5170 | | STR | SF |
| 0251 | 9B | 5180 | | GHI | SYNC |
| 0252 | FA03 | 5190 | | ANI | #3 |
| 0254 | C6 | 5200 | | LSNZ | |
| 0255 | 66 | 5210 | | OUT | CONTR |
| 0256 | 22 | 5220 | | DEC | SF |
| 0257 | F830 | 5230 | | LDI | A.1/RAM |
| 0259 | BE | 5240 | | PHI | UTILP1 |
| 025A | F8E4 | 5250 | | LDI | A.0/DAY3 |
| 025C | AE | 5260 | | PLO | UTILP1 |
| 025D | 0E | 5270 | | LDN | UTILP1 |
| 025E | 76 | 5280 | | SHRC | |
| 025F | 76 | 5290 | | SHRC | |
| 0260 | 76 | 5300 | | SHRC | |
| 0261 | 76 | 5310 | | SHRC | |
| 0262 | FAE0 | 5320 | | ANI | #E0 |
| 0264 | F91E | 5330 | | ORI | #1E |
| 0266 | AE | 5340 | | PLO | UTILP1 |
| 0267 | 0E | 5350 | | LDN | UTILP1 |
| 0268 | C20281 | 5360 | | LBZ | MHTOK |
| 026B | 98 | 5370 | | GHI | FLAG |
| 026C | FABF | 5380 | | ANI | NHTOK |
| 026E | B8 | 5390 | | PHI | FLAG |

| | | | | | |
|---|---|---|---|---|---|
| 026F | 88 | 5392 | | GLO | FLAG |
| 0270 | FA02 | 5394 | | ANI | DNFC |
| 0272 | 3A81 | 5396 | | BNZ | MHTOK |
| 0274 | 8E | 5400 | NHL | GLO | UTILP1 |
| 0275 | FF04 | 5410 | | SMI | #4 |
| 0277 | AE | 5420 | | PLO | UTILP1 |
| 0278 | FA1C | 5430 | | ANI | #1C |
| 027A | FB1C | 5440 | | XRI | #1C |
| 027C | 3287 | 5450 | | BZ | CORDAY |
| 027E | 0E | 5460 | | LDN | UTILP1 |
| 027F | 3274 | 5470 | | BZ | NHL |
| 0281 | 98 | 5480 | MHTOK | GHI | FLAG |
| 0282 | F940 | 5490 | | ORI | HTOK |
| 0284 | B8 | 5500 | | PHI | FLAG |
| 0285 | 308B | 5510 | | BR | AUXTST |
| 0287 | 8E | 5520 | CORDAY | GLO | UTILP1 |
| 0288 | FC04 | 5530 | | ADI | #4 |
| 028A | AE | 5540 | | PLO | UTILP1 |
| 028B | F860 | 5550 | AUXTST | LDI | A.1/RAM2 |
| 028D | BE | 5560 | | PHI | UTILP1 |
| 028E | 8E | 5570 | | GLO | UTILP1 |
| 028F | F91E | 5580 | | ORI | #1E |
| 0291 | AE | 5590 | | PLO | UTILP1 |
| 0292 | 0E | 5600 | AUXL | LDN | UTILP1 |
| 0293 | CA02A5 | 5610 | | LBNZ | CYCTIM |
| 0296 | 8F | 5620 | | GLO | UTILP1 |
| 0297 | FF04 | 5630 | | SMI | #4 |
| 0299 | AE | 5640 | | PLO | UTILP1 |
| 029A | FA1C | 5650 | | ANI | #1C |
| 029C | FB1C | 5660 | | XRI | #1C |
| 029E | CA0292 | 5670 | | LBNZ | AUXL |
| 02A1 | 98 | 5680 | | GHI | FLAG |
| 02A2 | FAFE | 5690 | | ANI | NAUXBIT |
| 02A4 | B8 | 5700 | | PHI | FLAG |
| 02A5 | 98 | 5710 | CYCTIM | GHI | FLAG |
| 02A6 | FA04 | 5720 | | ANI | COINBIT |
| 02A8 | C20406 | 5730 | | LBZ | BUTTON |
| 02AB | 98 | 5740 | | GHI | FLAG |
| 02AC | FAFB | 5750 | | ANI | NCOINBIT |
| 02AE | B8 | 5760 | | PHI | FLAG |
| 02AF | F8E4 | 5770 | | LDI | A.0/DAY3 |
| 02B1 | AE | 5780 | | PLO | UTILP1 |
| 02B2 | F830 | 5790 | | LDI | A.1/DAY3 |
| 02B4 | BE | 5800 | | PHI | UTILP1 |
| 02B5 | F860 | 5810 | | LDI | A.1/RAM2 |
| 02B7 | BA | 5820 | | PHI | UTILP2 |
| 02B8 | 0E | 5830 | | LDN | UTILP1 |
| 02B9 | 76 | 5840 | | SHRC | |
| 02BA | 76 | 5850 | | SHRC | |
| 02BB | 76 | 5860 | | SHRC | |
| 02BC | 76 | 5870 | | SHRC | |
| 02BD | FAE0 | 5880 | | ANI | #E0 |
| 02BF | AA | 5890 | | PLO | UTILP2 |
| 02C0 | EE | 5900 | | SEX | UTILP1 |
| 02C1 | F8E2 | 5910 | | LDI | A.0/TIME,+2 |
| 02C3 | AE | 5920 | | PLO | UTILP1 |
| 02C4 | 0E | 5930 | | LDN | UTILP1 |
| 02C5 | C20406 | 5940 | | LBZ | BUTTON |
| 02C8 | 2E | 5950 | | DEC | UTILP1 |
| 02C9 | 2E | 5960 | | DEC | UTILP1 |
| 02CA | 4A | 5970 | CMFD | LDA | UTILP2 |
| 02CB | F7 | 5980 | | SM | |
| 02CC | CA02D9 | 5990 | | LBNZ | NXT |
| 02CF | 8A | 6000 | | GLO | UTILP2 |
| 02D0 | FA03 | 6010 | | ANI | #3 |
| 02D2 | C202E8 | 6020 | | LBZ | COIN |
| 02D5 | 60 | 6030 | | IRX | |

| | | | | | |
|---|---|---|---|---|---|
| 02D6 | C002CA | 6040 | | LBR | CMPD |
| 02D9 | 2A | 6050 | NXT | DEC | UTILP2 |
| 02DA | 8A | 6060 | | GLO | UTILP2 |
| 02DB | FAFC | 6070 | | ANI | #FC |
| 02DD | FC04 | 6080 | | ADI | #4 |
| 02DF | AA | 6090 | | PLO | UTILP2 |
| 02E0 | FA1F | 6100 | | ANI | #1F |
| 02E2 | C20317 | 6110 | | LBZ | NOCOIN |
| 02E5 | C002C1 | 6120 | | LBR | CMPD,-9 |
| 02E8 | 2A | 6130 | COIN | DEC | UTILP2 |
| 02E9 | 9A | 6140 | | GHI | UTILP2 |
| 02EA | FA10 | 6150 | | ANI | #10 |
| 02EC | CA0303 | 6160 | | LBNZ | PRIM |
| 02EF | 8A | 6170 | | GLO | UTILP2 |
| 02F0 | FA04 | 6180 | | ANI | #4 |
| 02F2 | 32F9 | 6190 | | BZ | *,+7 |
| 02F4 | 9E | 6200 | | GHI | FLAG |
| 02F5 | FAFE | 6210 | | ANI | NAUXBIT |
| 02F7 | 30FC | 6220 | | BR | *,+5 |
| 02F9 | 9E | 6230 | | GHI | FLAG |
| 02FA | F901 | 6240 | | ORI | AUXBIT |
| 02FC | BE | 6250 | | PHI | FLAG |
| 02FD | 9E | 6260 | | GHI | UTILP1 |
| 02FE | BA | 6270 | | PHI | UTILP2 |
| 02FF | 8A | 6280 | | GLO | UTILP2 |
| 0300 | C002BD | 6290 | | LBR | CMPD,-13 |
| 0303 | 8A | 6300 | PRIM | GLO | UTILP2 |
| 0304 | FA04 | 6310 | | ANI | #4 |
| 0306 | C2030F | 6320 | | LBZ | DY |
| 0309 | 8E | 6330 | | GLO | FLAG |
| 030A | FAFE | 6340 | | ANI | NDNF |
| 030C | C00312 | 6350 | | LBR | PUT |
| 030F | 8E | 6360 | DY | GLO | FLAG |
| 0310 | F903 | 6370 | | ORI | DNFIC |
| 0312 | A8 | 6380 | PUT | PLO | FLAG |
| 0313 | 8A | 6390 | | GLO | UTILP2 |
| 0314 | FA1C | 6400 | | ANI | #1C |
| 0316 | E2 | 6410 | | SEX | SP |
| 0317 | 2A | 6420 | NOCOIN | DEC | UTILP2 |
| 0318 | 9A | 6430 | | GHI | UTILP2 |
| 0319 | FA10 | 6440 | | ANI | #10 |
| 031B | C202FD | 6450 | | LBZ | PRIM,-6 |
| 031F | 8C | 6460 | AUTO | GLO | RSTMR |
| 031F | CA0406 | 6470 | | LBNZ | BUTTON |
| 0322 | E2 | 6480 | | SEX | SP |
| 0323 | 8A | 6490 | | GLO | UTILP2 |
| 0324 | FAE0 | 6500 | | ANI | #E0 |
| 0326 | F903 | 6510 | | ORI | #3 |
| 0328 | AA | 6520 | | PLO | UTILP2 |
| 0329 | F8E3 | 6530 | | LDI | A.0/TIME,+3 |
| 032B | AE | 6540 | | PLO | UTILP1 |
| 032C | 7B | 6550 | | SEQ | |
| 032D | 0E | 6560 | OPTCAL | LDN | UTILP1 |
| 032E | EA | 6570 | | SEX | UTILP2 |
| 032F | F5 | 6580 | | SD | |
| 0330 | CB0403 | 6590 | | LBNF | CALEX |
| 0333 | 2E | 6600 | | DEC | UTILP1 |
| 0334 | 2A | 6610 | | DEC | UTILP2 |
| 0335 | A0 | 6620 | | PLO | TEMP |
| 0336 | 0A | 6630 | | LDN | UTILP2 |
| 0337 | C20403 | 6640 | | LBZ | CALEX |
| 033A | 80 | 6650 | | GLO | TEMP |
| 033B | CE | 6660 | | LSZ | |
| 033C | F80C | 6670 | | LDI | #C |
| 033E | F4 | 6680 | | ADD | |
| 033F | FF18 | 6690 | | SMI | #18 |
| 0341 | CE | 6700 | | LSZ | |

| | | | | | |
|---|---|---|---|---|---|
| 0342 | FC0C | 6710 | ADI | #C | |
| 0344 | FC0C | 6720 | ADI | #C | |
| 0346 | E2 | 6730 | SEX | SP | |
| 0347 | 52 | 6740 | STR | SP | |
| 0348 | 0E | 6750 | LDN | UTILP1 | |
| 0349 | FF0C | 6760 | SMI | #C | |
| 034B | CE | 6770 | LSZ | | |
| 034C | FC0C | 6780 | ADI | #C | |
| 034E | F5 | 6790 | SD | | |
| 034F | CB0403 | 6800 | LBNF | CALEX | |
| 0352 | 52 | 6810 | STR | SP | |
| 0353 | FF04 | 6820 | SMI | #4 | |
| 0355 | C30403 | 6830 | LBDF | CALEX | |
| 0358 | 02 | 6840 | LDN | SP | |
| 0359 | FE | 6850 | SHL | | |
| 035A | 52 | 6860 | STR | SP | |
| 035B | FE | 6870 | SHL | | |
| 035C | F4 | 6880 | ADD | | |
| 035D | 52 | 6890 | STR | SP | |
| 035E | 2E | 6900 | DEC | UTILP1 | |
| 035F | 2A | 6910 | DEC | UTILP2 | |
| 0360 | EA | 6920 | SEX | UTILP2 | |
| 0361 | 0E | 6930 | LDN | UTILP1 | |
| 0362 | F5 | 6940 | SD | | |
| 0363 | E2 | 6950 | SEX | SP | |
| 0364 | F4 | 6960 | ADD | | |
| 0365 | FE | 6970 | SHL | | |
| 0366 | 52 | 6980 | STR | SP | |
| 0367 | FE | 6990 | SHL | | |
| 0368 | FE | 7000 | SHL | | |
| 0369 | F4 | 7010 | ADD | | |
| 036A | 52 | 7020 | STR | SP | |
| 036B | 2E | 7030 | DEC | UTILP1 | |
| 036C | 2A | 7040 | DEC | UTILP2 | |
| 036D | EA | 7050 | SEX | UTILP2 | |
| 036E | 0E | 7060 | LDN | UTILP1 | |
| 036F | F5 | 7070 | SD | | |
| 0370 | E2 | 7080 | SEX | SP | |
| 0371 | F4 | 7090 | ADD | | |
| 0372 | 73 | 7100 | STXD | | |
| 0373 | FF79 | 7110 | SMI | #.121 | |
| 0375 | C30402 | 7120 | LBDF | SPCORR | |
| 0378 | F803 | 7130 | LDI | A.0/TEMPOUT | |
| 037A | AE | 7140 | PLO | UTILP1 | |
| 037B | F8A0 | 7150 | LDI | A.1/TEMPOUT | |
| 037D | BE | 7160 | PHI | UTILP1 | |
| 037E | EE | 7170 | SEX | UTILP1 | |
| 037F | F85F | 7180 | LDI | #.95 | |
| 0381 | F7 | 7190 | SM | | |
| 0382 | CF | 7200 | LSDF | | |
| 0383 | F800 | 7210 | LDI | #0 | |
| 0385 | 52 | 7220 | STR | SP | |
| 0386 | E2 | 7230 | SEX | SP | |
| 0387 | F83C | 7240 | LDI | #.60 | |
| 0389 | F7 | 7250 | SM | | |
| 038A | C7 | 7260 | LSNF | | |
| 038B | 02 | 7270 | LDN | SP | |
| 038C | C8 | 7280 | LSKP | | |
| 038D | F83C | 7290 | LDI | #.60 | |
| 038F | CD | 7300 | LSQ | | |
| 0390 | FD3C | 7310 | SDI | #.60 | |
| 0392 | AD | 7320 | PLO | UTIL | |
| 0393 | 6E | 7330 | INP | SW | |
| 0394 | FA02 | 7340 | ANI | #2 | |
| 0396 | 32A0 | 7350 | BZ | U0 | |
| 0398 | F0 | 7360 | LDX | | |
| 0399 | FA01 | 7370 | ANI | #1 | |
| 039B | 32A1 | 7380 | BZ | *.+6 | |

| | | | | | |
|---|---|---|---|---|---|
| 039D | 8B | 7390 | | GLO | UTIL |
| 039E | FE | 7400 | | SHL | |
| 039F | 30AE | 7410 | | BR | SCLND |
| 03A1 | 8B | 7420 | | GLO | UTIL |
| 03A2 | 52 | 7430 | | STR | SP |
| 03A3 | F6 | 7440 | | SHR | |
| 03A4 | F4 | 7450 | | ADD | |
| 03A5 | 30AE | 7460 | | BR | SCLND |
| 03A7 | F0 | 7470 | U0 | LDX | |
| 03A8 | FA01 | 7480 | | ANI | #1 |
| 03AA | 3AAF | 7490 | | BNZ | *,+5 |
| 03AC | 8B | 7500 | | GLO | UTIL |
| 03AD | F6 | 7510 | | SHR | |
| 03AE | AB | 7520 | SCLND | PLO | UTIL |
| 03AF | 8B | 7530 | | GLO | UTIL |
| 03B0 | 12 | 7540 | | INC | SP |
| 03B1 | C903F7 | 7550 | | LBNQ | OPEX |
| 03B4 | F7 | 7560 | | SM | |
| 03B5 | CB03CA | 7570 | | LBNF | OPTSD |
| 03B8 | 02 | 7580 | | LDN | SP |
| 03B9 | AC | 7590 | | PLO | BSTMR |
| 03BA | F800 | 7600 | | LDI | #0 |
| 03BC | B6 | 7610 | | PHI | VLVTMR |
| 03BD | 88 | 7620 | | GLO | FLAG |
| 03BE | F903 | 7630 | | ORI | DNFIC |
| 03C0 | A8 | 7640 | | PLO | FLAG |
| 03C1 | 6E | 7650 | | INP | SW |
| 03C2 | FA04 | 7660 | | ANI | BURNSW |
| 03C4 | 32CA | 7670 | | BZ | OPTSD |
| 03C6 | 88 | 7680 | | GLO | FLAG |
| 03C7 | FAD7 | 7690 | | ANI | NOCF |
| 03C9 | A8 | 7700 | | PLO | FLAG |
| 03CA | 7A | 7710 | OPTSD | REQ | |
| 03CB | E2 | 7720 | | SEX | SP |
| 03CC | 69 | 7730 | | INP | SWOPT |
| 03CD | FA01 | 7740 | | ANI | OPT |
| 03CF | C20406 | 7750 | | LBZ | BUTTON |
| 03D2 | 88 | 7760 | | GLO | FLAG |
| 03D3 | FA01 | 7770 | | ANI | DNF |
| 03D5 | C20406 | 7780 | | LBZ | BUTTON |
| 03D8 | 8A | 7790 | | GLO | UTILF2 |
| 03D9 | FAE0 | 7800 | | ANI | #E0 |
| 03DB | F91E | 7810 | | ORI | #1E |
| 03DD | AA | 7820 | | PLO | UTILF2 |
| 03DE | 0A | 7830 | | LDN | UTILF2 |
| 03DF | CA03F0 | 7840 | | LBNZ | *,+17 |
| 03E2 | 8A | 7850 | | GLO | UTILF2 |
| 03E3 | FF08 | 7860 | | SMI | #8 |
| 03E5 | AA | 7870 | | PLO | UTILF2 |
| 03E6 | FA18 | 7880 | | ANI | #18 |
| 03E8 | FB18 | 7890 | | XRI | #18 |
| 03EA | CA03DE | 7900 | | LBNZ | *,-12 |
| 03ED | C00406 | 7910 | | LBR | BUTTON |
| 03F0 | 1A | 7920 | | INC | UTILF2 |
| 03F1 | F8?? | 7930 | | LDI | A.O/TIME,+3 |
| ???? | ?? | 7940 | | PLO | UTILF? |
| 03F? | C00321 | 7950 | | LBR | OPTCAL |
| 03F? | F7 | 7960 | OPEX | SM | |
| 03F? | CB0406 | 7970 | | LBNF | BUTTON |
| 03F? | 88 | 7980 | | GLO | FLAG |
| 03FC | FAFE | 7990 | | ANI | NDNF |
| 03FE | A8 | 8000 | | PLO | FLAG |
| 03FF | C00406 | 8010 | | LBR | BUTTON |
| 0402 | 12 | 8020 | SPCORR | INC | SP |
| 0403 | C103CA | 8030 | CALEX | LBQ | OPTSD |
| 0406 | E2 | 10010 | BUTTON | SEX | SP |
| 0407 | 9B | 10020 | | GHI | SYNC |
| 0408 | FA01 | 10030 | | ANI | #1 |

| | | | | | |
|---|---|---|---|---|---|
| 040A | CA0563 | 10040 | | LBNZ | BEX |
| 040D | 6D | 10050 | | INP | PB |
| 040E | FA04 | 10060 | | ANI | PGMSK |
| 0410 | 3A1B | 10070 | | BNZ | *,+11 |
| 0412 | F8E0 | 10080 | | LDI | A.0/TIME |
| 0414 | AF | 10090 | | PLO | RF |
| 0415 | F830 | 10100 | | LDI | A.1/TIME |
| 0417 | BF | 10110 | | PHI | RF |
| 0418 | C004A5 | 10120 | | LBR | RDHM |
| 041B | 8F | 10130 | | GLO | RF |
| 041C | FFE0 | 10140 | | SMI | A.0/TIME |
| 041E | 3A23 | 10150 | | BNZ | *,+5 |
| 0420 | F800 | 10160 | | LDI | #0 |
| 0422 | AF | 10170 | | PLO | RF |
| 0423 | F0 | 10180 | | LDX | |
| 0424 | FA89 | 10190 | | ANI | CCRMSK |
| 0426 | C204B8 | 10200 | | LBZ | DHM |
| 0429 | 88 | 10210 | | GLO | FLAG |
| 042A | FA40 | 10220 | | ANI | BMSK |
| 042C | CA0563 | 10230 | | LBNZ | BEX |
| 042F | 88 | 10240 | | GLO | FLAG |
| 0430 | F940 | 10250 | | ORI | BMSK |
| 0432 | A8 | 10260 | | PLO | FLAG |
| 0433 | F0 | 10270 | | LDX | |
| 0434 | FA80 | 10280 | | ANI | CLMSK |
| 0436 | 3248 | 10290 | | BZ | COPY |
| 0438 | 8F | 10300 | | GLO | RF |
| 0439 | F907 | 10310 | | ORI | #7 |
| 043B | AF | 10320 | | PLO | RF |
| 043C | F800 | 10330 | | LDI | #0 |
| 043E | 5F | 10340 | | STR | RF |
| 043F | 8F | 10350 | | GLO | RF |
| 0440 | FA07 | 10360 | | ANI | #7 |
| 0442 | C20563 | 10370 | | LBZ | BEX |
| 0445 | 2F | 10380 | | DEC | RF |
| 0446 | 303C | 10390 | | BR | *,-10 |
| 0448 | F0 | 10400 | COPY | LDX | |
| 0449 | FA01 | 10410 | | ANI | CMSK |
| 044B | C20478 | 10420 | | LBZ | RVW |
| 044E | 8F | 10430 | | GLO | RF |
| 044F | FA5F | 10440 | | ANI | #5F |
| 0451 | C20563 | 10450 | | LBZ | BEX |
| 0454 | 8F | 10460 | | SEX | RF |
| 0455 | F860 | 10470 | | LDI | A.1/RAM2 |
| 0457 | BF | 10480 | | PHI | RF |
| 0458 | 8F | 10490 | COPLP | GLO | RF |
| 0459 | F91F | 10500 | | ORI | #1F |
| 045B | AF | 10510 | | PLO | RF |
| 045C | FF20 | 10520 | | SMI | #20 |
| 045E | AE | 10530 | | PLO | UTILP1 |
| 045F | 9F | 10540 | | GHI | RF |
| 0460 | BE | 10550 | | PHI | UTILP1 |
| 0461 | 0E | 10560 | COPLP2 | LDN | UTILP1 |
| 0462 | 73 | 10570 | | STXD | |
| 0463 | 8E | 10580 | | GLO | UTILP1 |
| 0464 | 2E | 10590 | | DEC | UTILP1 |
| 0465 | FA1F | 10600 | | ANI | #1F |
| 0467 | CA0461 | 10610 | | LBNZ | COPLP2 |
| 046A | 9F | 10620 | | GHI | RF |
| 046B | FA10 | 10630 | | ANI | #10 |
| 046D | CA0563 | 10640 | | LBNZ | BEX |
| 0470 | F830 | 10650 | | LDI | A.1/RAM |
| 0472 | BF | 10660 | | PHI | RF |
| 0473 | 1E | 10670 | | INC | UTILP1 |
| 0474 | 1F | 10680 | | INC | RF |
| 0475 | C00458 | 10690 | | LBR | COPLP |
| 0478 | 8F | 10700 | RVW | GLO | RF |
| 0479 | FC04 | 10710 | | ADI | #4 |

| | | | | |
|---|---|---|---|---|
| 047B | AF | 10720 | PLO | RF |
| 047C | 69 | 10730 | INP | SWOPT |
| 047D | FA10 | 10740 | ANI | AUXSET |
| 047F | C2049B | 10750 | LBZ | RVW2 |
| 0482 | 8F | 10760 | GLO | RF |
| 0483 | FA1E | 10770 | ANI | #1E |
| 0485 | CA0563 | 10780 | LBNZ | BEX |
| 0488 | 9F | 10790 | GHI | RF |
| 0489 | FA10 | 10800 | ANI | #10 |
| 048B | C20498 | 10810 | LBZ | RVW3 |
| 048E | F860 | 10820 | LDI | A.1/RAM2 |
| 0490 | BF | 10830 | PHI | RF |
| 0491 | 8F | 10840 | GLO | RF |
| 0492 | FF20 | 10850 | SMI | #20 |
| 0494 | AF | 10860 | PLO | RF |
| 0495 | C00563 | 10870 | LBR | BEX |
| 0498 | F830 | 10880 RVW3 | LDI | A.1/RAM |
| 049A | BF | 10890 | PHI | RF |
| 049B | 8F | 10900 RVW2 | GLO | RF |
| 049C | FFE0 | 10910 | SMI | #E0 |
| 049E | CF | 10920 | LSDF | |
| 049F | FCE0 | 10930 | ADI | #F0 |
| 04A1 | AF | 10940 | PLO | RF |
| 04A2 | C00563 | 10950 | LBR | BEX |
| 04A5 | F0 | 10960 RDHM | LDX | |
| 04A6 | FA76 | 10970 | ANI | RDHMSK |
| 04A8 | C204BD | 10980 | LBZ | DHM,+5 |
| 04AB | 88 | 10990 | GLO | FLAG |
| 04AC | FA40 | 11000 | ANI | BMSK |
| 04AE | CA0563 | 11010 | LBNZ | BEX |
| 04B1 | 88 | 11020 | GLO | FLAG |
| 04B2 | F9? | 11030 | ORI | |
| 04B4 | A8 | 11040 | PLO | FLAG |
| 04B5 | C004CE | 11050 | LBR | SHFT |
| 04B8 | F0 | 11060 DHM | LDX | |
| 04B9 | FA72 | 11070 | ANI | DHMSK |
| 04BB | 3AC4 | 11080 | BNZ | *,+9 |
| 04BD | 88 | 11090 | GLO | FLAG |
| 04BE | FABF | 11100 | ANI | NBMSK |
| 04C0 | A8 | 11110 | PLO | FLAG |
| 04C1 | C00563 | 11120 | LBR | BEX |
| 04C4 | 88 | 11130 | GLO | FLAG |
| 04C5 | FA40 | 11140 | ANI | BMSK |
| 04C7 | CA0563 | 11150 | LBNZ | BEX |
| 04CA | 88 | 11160 | GLO | FLAG |
| 04CB | F940 | 11170 | ORI | BMSK |
| 04CD | A8 | 11180 | PLO | FLAG |
| 04CE | F0 | 11190 SHFT | LDX | |
| 04CF | FA20 | 11200 | ANI | SMSK |
| 04D1 | C20506 | 11210 | LBZ | DAY |
| 04D4 | 8C | 11220 | GLO | RSTMR |
| 04D5 | CA0506 | 11230 | LBNZ | DAY |
| 04D8 | 88 | 11240 | GLO | FLAG |
| 04D9 | FA02 | 11250 | ANI | DNFC |
| 04DB | CA04F3 | 11260 | LBNZ | NITE2 |
| 04DE | 88 | 11270 | GLO | FLAG |
| 04DF | F902 | 11280 | ORI | DNFC |
| 04E1 | A8 | 11290 | PLO | FLAG |
| 04E2 | F0 | 11300 | LDX | |
| 04E3 | FA04 | 11310 | ANI | PGMSK |
| 04E5 | C204EE | 11320 | LBZ | *,+9 |
| 04E8 | 88 | 11330 | GLO | FLAG |
| 04E9 | F901 | 11340 | ORI | DNF |
| 04EB | C00502 | 11350 | LBR | BSTCL |
| 04EE | F85A | 11360 | LDI | #.90 |
| 04F0 | C00505 | 11370 | LBR | BSTCL,+3 |
| 04F3 | F0 | 11380 NITE2 | LDX | |
| 04F4 | FA04 | 11390 | ANI | PGMSK |

| | | | | |
|---|---|---|---|---|
| 04F6 | C204FF | 11400 | LBZ | *,+9 |
| 04F9 | 88 | 11410 | GLO | FLAG |
| 04FA | FAFE | 11420 | ANI | NDNF |
| 04FC | C00502 | 11430 | LBR | BSTCL |
| 04FF | 88 | 11440 | GLO | FLAG |
| 0500 | FAFD | 11450 | ANI | NDNFC |
| 0502 | A8 | 11460 BSTCL | PLO | FLAG |
| 0503 | F800 | 11470 | LDI | #0 |
| 0505 | BC | 11480 | PHI | H1.5B |
| 0506 | F0 | 11490 DAY | LDX | |
| 0507 | FA10 | 11500 | ANI | DMSK |
| 0509 | C20531 | 11510 | LBZ | HRS |
| 050C | F0 | 11520 | LDX | |
| 050D | FA04 | 11530 | ANI | PGMSK |
| 050F | 321F | 11540 | BZ | DOW |
| 0511 | 8F | 11550 | GLO | RF |
| 0512 | FAE0 | 11560 | ANI | #E0 |
| 0514 | FFC0 | 11570 | SMI | #C0 |
| 0516 | CF | 11580 | LSDF | |
| 0517 | FCE0 | 11590 | ADI | #E0 |
| 0519 | AF | 11600 | PLO | RF |
| 051A | F830 | 11610 | LDI | A.1/RAM |
| 051C | BF | 11620 | PHI | RF |
| 051D | 3063 | 11630 | BR | BEX |
| 051F | F88F | 11640 DOW | LDI | A.0/INCDAY |
| 0521 | A5 | 11650 | PLO | SUBSUB |
| 0522 | F80D | 11660 | LDI | A.1/INCDAY |
| 0524 | B5 | 11670 | PHI | SUBSUB |
| 0525 | D5 | 11680 | SEP | SUBSUB |
| 0526 | F852 | 11690 | LDI | A.0/SUB4 |
| 0528 | A5 | 11700 | PLO | SUBSUB |
| 0529 | F80C | 11710 | LDI | A.1/SUB4 |
| 052B | B5 | 11720 | PHI | SUBSUB |
| 052C | 22 | 11730 | DEC | SP |
| 052D | F8FF | 11740 | LDI | #FF |
| 052F | 52 | 11750 | STR | SP |
| 0530 | D5 | 11760 | SEP | SUBSUB |
| 0531 | 9F | 11770 HRS | GHI | RF |
| 0532 | BE | 11780 | PHI | UTILP1 |
| 0533 | 8F | 11790 | GLO | RF |
| 0534 | AE | 11800 | PLO | UTILP1 |
| 0535 | 6D | 11810 | INP | PB |
| 0536 | FA40 | 11820 | ANI | HMSK |
| 0538 | 324C | 11830 | BZ | MINS |
| 053A | F86D | 11840 | LDI | A.0/INCHRS |
| 053C | A5 | 11850 | PLO | SUBSUB |
| 053D | F80D | 11860 | LDI | A.1/INCHRS |
| 053F | B5 | 11870 | PHI | SUBSUB |
| 0540 | D5 | 11880 | SEP | SUBSUB |
| 0541 | F852 | 11890 | LDI | A.0/SUB4 |
| 0543 | A5 | 11900 | PLO | SUBSUB |
| 0544 | F80C | 11910 | LDI | A.1/SUB4 |
| 0546 | B5 | 11920 | PHI | SUBSUB |
| 0547 | F83C | 11930 | LDI | #.60 |
| 0549 | 22 | 11940 | DEC | SP |
| 054A | 52 | 11950 | STR | SP |
| 054B | D5 | 11960 | SEP | SUBSUB |
| 054C | F0 | 11970 MINS | LDX | |
| 054D | FA02 | 11980 | ANI | MMSK |
| 054F | 3263 | 11990 | BZ | BEX |
| 0551 | F856 | 12000 | LDI | A.0/INCMIN |
| 0553 | A5 | 12010 | PLO | SUBSUB |
| 0554 | F80D | 12020 | LDI | A.1/INCMIN |
| 0556 | B5 | 12030 | PHI | SUBSUB |
| 0557 | D5 | 12040 | SEP | SUBSUB |
| 0558 | F852 | 12050 | LDI | A.0/SUB4 |
| 055A | A5 | 12060 | PLO | SUBSUB |
| 055B | F80C | 12070 | LDI | A.1/SUB4 |

| | | | | | |
|---|---|---|---|---|---|
| 055D | E5 | 12080 | | PHI | SUBSUB |
| 055E | 22 | 12090 | | DEC | SP |
| 055F | F801 | 12100 | | LDI | #1 |
| 0561 | 52 | 12110 | | STR | SP |
| 0562 | D5 | 12120 | | SEP | SUBSUB |
| 0563 | D3 | 12130 | BEX | SEP | PC |
| 0564 | EE | 12140 | DISSTP | SEX | UTILP1 |
| 0565 | F80 | 12150 | | LDI | A.0/DTSP+45 |
| 0567 | A2 | 12160 | | PLO | UTILP1 |
| 0568 | F8A | 12170 | | LDI | A.1/DTSP+45 |
| 056A | B2 | 12180 | | PHI | UTILP1 |
| 056B | 4F | 12190 | | LDA | RF |
| 056C | 73 | 12200 | | STXD | |
| 056D | 4F | 12210 | | LDA | RF |
| 056E | 73 | 12220 | | STXD | |
| 056F | 0F | 12230 | | LDN | RF |
| 0570 | CA0588 | 12240 | | LBNZ | HRDEC |
| 0573 | 1F | 12250 | | INC | RF |
| 0574 | 60 | 12260 | | IRX | |
| 0575 | 60 | 12270 | | IRX | |
| 0576 | F80D | 12280 | | LDI | VE |
| 0578 | 73 | 12290 | | STXD | |
| 0579 | F80E | 12300 | | LDI | VN |
| 057B | 73 | 12310 | | STXD | |
| 057C | F800 | 12320 | | LDI | VO |
| 057E | 73 | 12330 | | STXD | |
| 057F | F80E | 12340 | | LDI | VN |
| 0581 | 73 | 12350 | | STXD | |
| 0582 | F8FF | 12360 | | LDI | #FF |
| 0584 | 73 | 12370 | | STXD | |
| 0585 | C005DD | 12380 | | LBR | DAY2 |
| 0588 | 9D | 12390 | HRDEC | GHI | HZCNTR |
| 0589 | 76 | 12400 | | SHRC | |
| 058A | 98 | 12410 | | GHI | FLAG |
| 058B | CF | 12420 | | LSDF | |
| 058C | F902 | 12430 | | ORI | COLONBIT |
| 058E | B8 | 12440 | | PHI | FLAG |
| 058F | 6F | 12450 | | INP | SW |
| 0590 | FA20 | 12460 | | ANI | T4HR |
| 0592 | 32B7 | 12470 | | BZ | TWLV |
| 0594 | 1F | 12480 | | INC | RF |
| 0595 | 0F | 12490 | | LDN | RF |
| 0596 | 2F | 12500 | | DEC | RF |
| 0597 | 32A3 | 12510 | | BZ | MID |
| 0599 | 4F | 12520 | | LDA | RF |
| 059A | FF0C | 12530 | | SMI | #.12 |
| 059C | FC0C | 12540 | | ADI | #.12 |
| 059E | C7 | 12550 | | LSNF | |
| 059F | FC0C | 12560 | | ADI | #.12 |
| 05A1 | 30B8 | 12570 | | BR | TWLV+1 |
| 05A3 | 4F | 12580 | MID | LDA | RF |
| 05A4 | FF0C | 12590 | | SMI | #.12 |
| 05A6 | FC0C | 12600 | | ADI | #.12 |
| 05A8 | 33B8 | 12610 | | BDF | TWLV+1 |
| 05AA | 1E | 12620 | | INC | UTILP1 |
| 05AB | 4E | 12630 | | LDA | UTILP1 |
| 05AC | F4 | 12640 | | ADD | |
| 05AD | 2E | 12650 | | DEC | UTILP1 |
| 05AE | 2E | 12660 | | DEC | UTILP1 |
| 05AF | FF01 | 12670 | | SMI | #1 |
| 05B1 | F818 | 12680 | | LDI | #.24 |
| 05B3 | C7 | 12690 | | LSNF | |
| 05B4 | F800 | 12700 | | LDI | #0 |
| 05B6 | 3E | 12710 | | SKP | |
| 05B7 | 4F | 12720 | TWLV | LDA | RF |
| 05B8 | FF0A | 12730 | | SMI | #A |
| 05BA | 33C5 | 12740 | | BDF | OV19 |

| | | | | |
|---|---|---|---|---|
| 05BC | FC0A | 12750 | ADI | #A |
| 05BE | 73 | 12760 | STXD | |
| 05BF | CE | 12770 | LSZ | |
| 05C0 | F80A | 12780 | LDI | #A |
| 05C2 | 73 | 12790 | STXD | |
| 05C3 | 30D5 | 12800 | BR | AFM |
| 05C5 | FF0A | 12810 OV19 | SMI | #A |
| 05C7 | 3BCF | 12820 | BNF | OV9 |
| 05C9 | 73 | 12830 | STXD | |
| 05CA | F802 | 12840 | LDI | #2 |
| 05CC | 73 | 12850 | STXD | |
| 05CD | 30D5 | 12860 | BR | AFM |
| 05CF | FC0A | 12870 OV9 | ADI | #A |
| 05D1 | 73 | 12880 | STXD | |
| 05D2 | F801 | 12890 | LDI | #1 |
| 05D4 | 73 | 12900 | STXD | |
| 05D5 | 0F | 12910 AFM | LDN | RF |
| 05D6 | 76 | 12920 | SHRC | |
| 05D7 | F8EF | 12930 | LDI | FM |
| 05D9 | CF | 12940 | LSDF | |
| 05DA | F8DF | 12950 | LDI | AM |
| 05DC | 73 | 12960 | STXD | |
| 05DD | 8F | 12970 DAY2 | GLO | RF |
| 05DE | FFE3 | 12980 | SMI | A.0/TIME,+3 |
| 05E0 | CA0687 | 12990 | LBNZ | ID |
| 05E3 | 1F | 13000 | INC | RF |
| 05E4 | 0F | 13010 | LDN | RF |
| 05E5 | 5E | 13020 | STR | UTILP1 |
| 05E6 | F80C | 13030 SINE | LDI | A.0/DISP,+7 |
| 05E8 | AE | 13040 | PLO | UTILP1 |
| 05E9 | E2 | 13050 | SEX | SP |
| 05EA | 6E | 13060 | INP | SW |
| 05EB | FA10 | 13070 | ANI | PEEKMSK |
| 05ED | 32F9 | 13080 | BZ | INDRT |
| 05EF | F8A0 | 13090 | LDI | A.1/TGT |
| 05F1 | BA | 13100 | PHI | UTILP2 |
| 05F2 | F800 | 13110 | LDI | A.0/TGT |
| 05F4 | AA | 13120 | PLO | UTILP2 |
| 05F5 | 0A | 13130 | LDN | UTILP2 |
| 05F6 | C0062A | 13140 | LBR | DEC,-1 |
| 05F9 | F802 | 13150 INDRT | LDI | A.0/TEMPIN |
| 05FB | AA | 13160 | PLO | UTILP2 |
| 05FC | F8A0 | 13170 | LDI | A.1/TEMPIN |
| 05FE | BA | 13180 | PHI | UTILP2 |
| 05FF | 69 | 13190 | INP | SWOPT |
| 0600 | FA05 | 13200 | ANI | IND |
| 0602 | CA0609 | 13210 | LBNZ | OUTD |
| 0605 | 0A | 13220 | LDN | UTILP2 |
| 0606 | C0062A | 13230 | LBR | DEC,-1 |
| 0609 | 1A | 13240 OUTD | INC | UTILP2 |
| 060A | 98 | 13250 | GHI | FLAG |
| 060B | FA80 | 13260 | ANI | CELBIT |
| 060D | C20615 | 13270 | LBZ | FNHT |
| 0610 | 0A | 13280 | LDN | UTILP2 |
| 0611 | FF28 | 13290 | SMI | #.40 |
| 0613 | 3018 | 13300 | BR | TD |
| 0615 | 0A | 13310 FNHT | LDN | UTILP2 |
| 0616 | FF1E | 13320 | SMI | #.30 |
| 0618 | 5E | 13330 TD | STR | UTILP1 |
| 0619 | 332B | 13340 | BDF | DEC |
| 061B | F806 | 13350 SIGN | LDI | A.0/DISP,+1 |
| 061D | AE | 13360 | PLO | UTILP1 |
| 061E | 0E | 13370 | LDN | UTILP1 |
| 061F | FAFE | 13380 | ANI | SGN |
| 0621 | 5E | 13390 | STR | UTILP1 |
| 0622 | F80C | 13400 | LDI | A.0/DISP,+7 |
| 0624 | AE | 13410 | PLO | UTILP1 |
| 0625 | 0E | 13420 | LDN | UTILP1 |

| | | | | | |
|---|---|---|---|---|---|
| 0626 | FBFF | 13430 | | XRI | #FF |
| 0628 | FC01 | 13440 | | ADI | #1 |
| 062A | 5E | 13450 | | STR | UTILP1 |
| 062B | EE | 13460 | DEC | SEX | UTILP1 |
| 062C | F800 | 13470 | | LDI | #0 |
| 062E | AB | 13480 | | PLO | UTIL |
| 062F | 0E | 13490 | | LDN | UTILP1 |
| 0630 | FF0A | 13500 | | SMI | #A |
| 0632 | 1B | 13510 | | INC | UTIL |
| 0633 | 3330 | 13520 | | BDF | *,-3 |
| 0635 | 2B | 13530 | | DEC | UTIL |
| 0636 | FC0A | 13540 | | ADI | #A |
| 0638 | 73 | 13550 | | STXD | |
| 0639 | 8B | 13560 | | GLO | UTIL |
| 063A | 5E | 13570 | | STR | UTILP1 |
| 063B | F800 | 13580 | | LDI | #0 |
| 063D | AB | 13590 | | PLO | UTIL |
| 063E | 0E | 13600 | | LDN | UTILP1 |
| 063F | FF0A | 13610 | | SMI | #A |
| 0641 | 1B | 13620 | | INC | UTIL |
| 0642 | 333F | 13630 | | BDF | *,-3 |
| 0644 | 2B | 13640 | | DEC | UTIL |
| 0645 | FC0A | 13650 | | ADI | #A |
| 0647 | 5E | 13660 | | STR | UTILP1 |
| 0648 | 8B | 13670 | | GLO | UTIL |
| 0649 | 3265 | 13680 | | BZ | U99 |
| 064B | FF01 | 13690 | | SMI | #1 |
| 064D | 3A5B | 13700 | | BNZ | 0200 |
| 06A0 | F6 | 14270 | | SHR | |
| 06A1 | F6 | 14280 | | SHR | |
| 06A2 | FA01 | 14290 | | ANI | #1 |
| 06A4 | FC0B | 14300 | | ADI | #B |
| 06A6 | 5E | 14310 | | STR | UTILP1 |
| 06A7 | 9F | 14320 | | GHI | RF |
| 06A8 | FA40 | 14330 | | ANI | #40 |
| 06AA | CE | 14340 | | LSZ | |
| 06AB | F804 | 14350 | | LDI | #4 |
| 06AD | F4 | 14360 | | ADD | |
| 06AE | 5E | 14370 | | STR | UTILP1 |
| 06AF | F80C | 14380 | DCD | LDI | A.0/DISP,+7 |
| 06B1 | A5 | 14390 | | PLO | UTILP2 |
| 06B2 | EE | 14400 | | SEX | UTILP1 |
| 06B3 | F80D | 14410 | | LDI | A.1/7SEG |
| 06B5 | BF | 14420 | | PHI | UTILP2 |
| 06B6 | F800 | 14430 | LOKUP | LDI | A.0/7SEG |
| 06B8 | F4 | 14440 | | ADD | |
| 06B9 | AA | 14450 | | PLO | UTILP2 |
| 06BA | 9B | 14460 | | GHI | FLAG |
| 06BB | FA02 | 14470 | | ANI | COLONBIT |
| 06BD | FF01 | 14480 | | SMI | #1 |
| 06BF | 0A | 14490 | | LDN | UTILP2 |
| 06C0 | C7 | 14500 | | LSNF | |
| 06C1 | FAFD | 14510 | | ANI | COL |
| 06C3 | 73 | 14520 | | STXD | |
| 06C4 | 8E | 14530 | | GLO | UTILP1 |
| 06C5 | FD06 | 14540 | | SDI | A.0/DISP,+1 |
| 06C7 | CA06B6 | 14550 | | LBNZ | LOKUP |
| 06CA | 9B | 14560 | | GHI | FLAG |
| 06CB | FAFD | 14570 | | ANI | NCOLONBIT |
| 06CD | B8 | 14580 | | PHI | FLAG |
| 06CE | 2E | 14590 | | DEC | UTILP1 |
| 06CF | 0E | 14600 | | LDN | UTILP1 |
| 06D0 | FC9D | 14610 | | ADI | A.0/DAYCHT |
| 06D2 | AA | 14620 | | PLO | UTILP2 |
| 06D3 | F800 | 14630 | | LDI | #0 |
| 06D5 | 7C0D | 14640 | | ADCI | A.1/DAYCHT |
| 06D7 | BA | 14650 | | PHI | UTILP2 |

| | | | | | |
|---|---|---|---|---|---|
| 06D8 | 0A | 14660 | | LDN | UTILF2 |
| 06D9 | 5E | 14670 | | STR | UTILF1 |
| 06DA | D3 | 14680 | | SEP | PC |
| 06DB | 7A | 20010 | MEASURE | REQ | |
| 06DC | E2 | 20020 | | SEX | SP |
| 06DD | F802 | 20030 | | LDI | A.0/TEMPIN |
| 06DF | AE | 20040 | | PLO | UTILF1 |
| 06E0 | F8A0 | 20050 | | LDI | A.1/TEMPIN |
| 06E2 | BE | 20060 | | PHI | UTILF1 |
| 06E3 | F801 | 20070 | | LDI | A.0/A-D |
| 06E5 | A5 | 20080 | | PLO | SUBSUB |
| 06E6 | F80C | 20090 | | LDI | A.1/A-D |
| 06E8 | B5 | 20100 | | PHI | SUBSUB |
| 06E9 | F8F5 | 20110 | | LDI | ITMSK |
| 06EB | D5 | 20120 | MEAS | SEP | SUBSUB |
| 06EC | 02 | 20130 | | LDN | SP |
| 06ED | C5 | 20140 | | LSNQ | |
| 064F | F80A | 13710 | | LDI | A.0/DISP,+1 |
| 0651 | AE | 13720 | | PLO | UTILF1 |
| 0652 | 0E | 13730 | | LDN | UTILF1 |
| 0653 | FAF3 | 13740 | | ANI | ONE |
| 0655 | 5E | 13750 | | STR | UTILF1 |
| 0656 | F80B | 13760 | | LDI | A.0/DISP,+6 |
| 0658 | AE | 13770 | | PLO | UTILF1 |
| 0659 | 3065 | 13780 | | BR | U99 |
| 065B | 8F | 13790 | D200 | GLO | HZCNTR |
| 065C | FA2C | 13800 | | ANI | $2C |
| 065E | 3265 | 13810 | | BZ | U99 |
| 0660 | 1E | 13820 | | INC | UTILF1 |
| 0661 | F80A | 13830 | | LDI | $A |
| 0663 | 73 | 13840 | | STXD | |
| 0664 | 5E | 13850 | | STR | UTILF1 |
| 0665 | F8E0 | 13860 | U99 | LDI | A.0/TIME |
| 0667 | AF | 13870 | | PLO | RF |
| 0668 | E2 | 13880 | | SEX | SP |
| 0669 | 6E | 13890 | | INP | SW |
| 066A | FA10 | 13900 | | ANI | PEERMSK |
| 066C | C206AF | 13910 | | LBZ | DCD |
| 066F | 69 | 13920 | | INP | SWOPT |
| 0670 | FA08 | 13930 | | ANI | WINTER |
| 0672 | CA06AF | 13940 | | LBNZ | DCD |
| 0675 | F806 | 13950 | | LDI | A.0/DISP,+1 |
| 0677 | AE | 13960 | | PLO | UTILF1 |
| 0678 | 0E | 13970 | | LDN | UTILF1 |
| 0679 | F9CF | 13980 | | ORI | AMPM |
| 067B | 5E | 13990 | | STR | UTILF1 |
| 067C | F80C | 14000 | | LDI | A.0/DISP,+7 |
| 067E | AE | 14010 | | PLO | UTILF1 |
| 067F | EE | 14020 | | SEX | UTILF1 |
| 0680 | F80A | 14030 | | LDI | $A |
| 0682 | 73 | 14040 | | STXD | |
| 0683 | 5E | 14050 | | STR | UTILF1 |
| 0684 | C006AF | 14060 | | LBR | DCD |
| 0687 | 8F | 14070 | ID | GLO | RF |
| 0688 | FAFC | 14080 | | ANI | #FC |
| 068A | AF | 14090 | | PLO | RF |
| 068B | 7E | 14100 | | SHLC | |
| 068C | 7E | 14110 | | SHLC | |
| 068D | 7E | 14120 | | SHLC | |
| 068E | 7E | 14130 | | SHLC | |
| 068F | FA07 | 14140 | | ANI | #7 |
| 0691 | 5E | 14150 | | STR | UTILF1 |
| 0692 | F80B | 14160 | | LDI | A.0/DISP,+6 |
| 0694 | AE | 14170 | | PLO | UTILF1 |
| 0695 | 8F | 14180 | | GLO | RF |
| 0696 | F6 | 14190 | | SHR | |
| 0697 | F6 | 14200 | | SHR | |
| 0698 | F6 | 14210 | | SHR | |

| | | | | |
|---|---|---|---|---|
| 0699 | FA03 | 14220 | ANI | #3 |
| 069B | FC01 | 14230 | ADI | #1 |
| 069D | 5E | 14240 | STR | UTILP1 |
| 069E | 1E | 14250 | INC | UTILP1 |
| 069F | 8F | 14260 | GLO | RF |
| 06EE | FC | 20150 | SHR | |
| 06EF | C4 | 20160 | NOP | |
| 06F0 | A0 | 20170 | PLO | TEMP |
| 06F1 | 98 | 20180 | GHI | FLAG |
| 06F2 | FA80 | 20190 | ANI | CELBIT |
| 06F4 | C20712 | 20200 | LBZ | FAHR |
| 06F7 | 80 | 20210 | GLO | TEMP |
| 06F8 | 52 | 20220 | STR | SP |
| 06F9 | F8AI | 20230 | LDI | A.0/CEL- |
| 06FB | CD | 20240 | LSG | |
| 06FC | F8CI | 20250 | LDI | A.0/CEL+ |
| 06FE | F4 | 20260 | ADD | |
| 06FF | AE | 20270 | PLO | UTILP2 |
| 0700 | F80D | 20280 | LDI | A.1/CEL- |
| 0702 | CD | 20290 | LSG | |
| 0703 | F80D | 20300 | LDI | A.1/CEL+ |
| 0705 | 7C00 | 20310 | ADCI | #0 |
| 0707 | BA | 20320 | PHI | UTILP2 |
| 0708 | 0A | 20330 | LDN | UTILP2 |
| 0709 | C10711 | 20340 | LBR | FAHR+1 |
| 070C | FF28 | 20350 | SMI | #.40 |
| 070E | CF | 20360 | LSDF | |
| 070F | F800 | 20370 | LDI | #0 |
| 0711 | A0 | 20380 | PLO | TEMP |
| 0712 | 1E | 20390 FAHR | INC | SP |
| 0713 | C5 | 20400 | LSNG | |
| 0714 | 1E | 20410 | INC | SP |
| 0715 | C4 | 20420 | NOP | |
| 0716 | E5 | 20430 | SEX | UTILP1 |
| 0717 | 80 | 20440 | GLO | TEMP |
| 0718 | F5 | 20450 | SD | |
| 0719 | C2074E | 20460 | LBZ | T= |
| 071C | CB0733 | 20470 | LBNF | T> |
| 071F | 02 | 20480 T< | LDN | SP |
| 0720 | FBF8 | 20490 | XRI | #F8 |
| 0722 | C2072C | 20500 | LBZ | USEIT |
| 0725 | 02 | 20510 | LDN | SP |
| 0726 | FF01 | 20520 | SMI | #1 |
| 0728 | 52 | 20530 | STR | SP |
| 0729 | C00752 | 20540 | LBR | TDONE |
| 072C | 02 | 20550 USEIT | LDN | SP |
| 072D | FC03 | 20560 | ADI | #3 |
| 072F | 52 | 20570 | STR | SP |
| 0730 | C00742 | 20580 | LBR | SPLDIF |
| 0733 | 02 | 20590 T> | LDN | SP |
| 0734 | FB08 | 20600 | XRI | #8 |
| 0736 | 323E | 20610 | BZ | USEIT+ |
| 0738 | 02 | 20620 | LDN | SP |
| 0739 | FC01 | 20630 | ADI | #1 |
| 073B | 52 | 20640 | STR | SP |
| 073C | 3052 | 20650 | BR | TDONE |
| 073E | 02 | 20660 USEIT+ | LDN | SP |
| 073F | FF03 | 20670 | SMI | #3 |
| 0741 | 52 | 20680 | STR | SP |
| 0742 | 80 | 20690 SPLDIF | GLO | TEMP |
| 0743 | F7 | 20700 | SM | |
| 0744 | C7 | 20710 | LSNF | |
| 0745 | FC01 | 20720 | ADI | #1 |
| 0747 | B0 | 20730 | PHI | TEMP |
| 0748 | FE | 20740 | SHL | |
| 0749 | 90 | 20750 | GHI | TEMP |
| 074A | 7E | 20760 | SHRC | |

| | | | | | |
|---|---|---|---|---|---|
| 074B | F4 | 20770 | | ADD | |
| 074C | 5E | 20780 | | STR | UTILP1 |
| 074D | 3052 | 20790 | | BR | TDONE |
| 074F | F800 | 20800 | T= | LDI | #0 |
| 0751 | 52 | 20810 | | STR | SP |
| 0752 | 22 | 20820 | TDONE | DEC | SP |
| 0753 | C5 | 20830 | | LSNQ | |
| 0754 | 22 | 20840 | | DEC | SP |
| 0755 | C4 | 20850 | | NOP | |
| 0756 | E2 | 20860 | | SEX | SP |
| 0757 | 3160 | 20870 | | BQ | TXIT |
| 0759 | 1E | 20880 | | INC | UTILP1 |
| 075A | 7B | 20890 | | SEQ | |
| 075B | F8FF | 20900 | | LDI | OTMSK |
| 075D | C006EB | 20910 | | LBR | MEAS |
| 0760 | 9B | 20920 | TXIT | GHI | SYNC |
| 0761 | FA80 | 20930 | | ANI | #80 |
| 0763 | C20563 | 20940 | | LBZ | DISSTP,-1 |
| 0766 | 9B | 20950 | | GHI | SYNC |
| 0767 | FABF | 20960 | | ANI | #BF |
| 0769 | BB | 20970 | | PHI | SYNC |
| 076A | D3 | 20980 | | SEP | PC |
| 076B | F801 | 20990 | | LDI | A.0/A-D |
| 076D | A5 | 21000 | | PLO | SUBSUB |
| 076E | F80C | 21010 | | LDI | A.1/A-D |
| 0770 | B5 | 21020 | | PHI | SUBSUB |
| 0771 | F8F8 | 21030 | MANPOS | LDI | REMPOT |
| 0773 | D5 | 21040 | | SEP | SUBSUB |
| 0774 | 02 | 21050 | | LDN | SP |
| 0775 | A0 | 21060 | | PLO | TEMP |
| 0776 | F8FC | 21070 | | LDI | VLVPOT |
| 0778 | D5 | 21080 | | SEP | SUBSUB |
| 0779 | 80 | 21090 | | GLO | TEMP |
| 077A | FF08 | 21100 | | SMI | #8 |
| 077C | CB07C4 | 21110 | | LBNF | OFF |
| 077F | F802 | 21120 | | LDI | #2 |
| 0781 | B6 | 21130 | | PHI | VLVTMR |
| 0782 | 80 | 21140 | | GLO | TEMP |
| 0783 | F6 | 21150 | | SHR | |
| 0784 | F6 | 21160 | | SHR | |
| 0785 | A0 | 21170 | | PLO | TEMP |
| 0786 | FF02 | 21180 | | SMI | #2 |
| 0788 | 80 | 21190 | | GLO | TEMP |
| 0789 | CF | 21200 | | LSDF | |
| 078A | F802 | 21210 | | LDI | #2 |
| 078C | A0 | 21220 | | PLO | TEMP |
| 078D | 02 | 21230 | | LDN | SP |
| 078E | F6 | 21240 | | SHR | |
| 078F | F6 | 21250 | | SHR | |
| 0790 | 52 | 21260 | | STR | SP |
| 0791 | 88 | 21270 | | GLO | FLAG |
| 0792 | FA28 | 21280 | | ANI | OCF |
| 0794 | 32BC | 21290 | | BZ | DEAD |
| 0796 | 88 | 21300 | | GLO | FLAG |
| 0797 | FAD7 | 21310 | | ANI | NOCF |
| 0799 | A8 | 21320 | | PLO | FLAG |
| 079A | 80 | 21330 | | GLO | TEMP |
| 079B | FF01 | 21340 | | SMI | #1 |
| 079D | F5 | 21350 | | SD | |
| 079E | C207EF | 21360 | | LBZ | VALVE |
| 07A1 | F820 | 21370 | | LDI | OPNFLG |
| 07A3 | CF | 21380 | | LSDF | |
| 07A4 | F808 | 21390 | MANCLS | LDI | CLSFLG |
| 07A6 | 52 | 21400 | | STR | SP |
| 07A7 | 88 | 21410 | | GLO | FLAG |
| 07A8 | F1 | 21420 | | OR | |
| 07A9 | A8 | 21430 | | PLO | FLAG |

| | | | | | |
|---|---|---|---|---|---|
| 07AA | F800 | | 21440 | LDI | #0 |
| 07AC | B6 | | 21450 | PHI | VLVTMR |
| 07AD | C007EF | | 21460 | LBR | VALVE |
| 07B0 | 80 | 21470 DEAD2 | GLO | TEMP |
| 07B1 | F7 | | 21480 | SM | |
| 07B2 | 33B6 | | 21490 | BDF | MANOPN |
| 07B4 | 30A4 | | 21500 | BR | MANCLS |
| 07B6 | 80 | 21510 MANOPN | GLO | TEMP |
| 07B7 | FF02 | | 21520 | SMI | #2 |
| 07B9 | F5 | | 21530 | SD | |
| 07BA | C307EF | | 21540 | LBDF | VALVE |
| 07BD | 88 | | 21550 | GLO | FLAG |
| 07BE | F920 | | 21560 | ORI | OPNFLG |
| 07C0 | A8 | | 21570 | PLO | FLAG |
| 07C1 | C007EF | | 21580 | LBR | VALVE |
| 07C4 | 96 | 21590 OFF | GHI | VLVTMR |
| 07C5 | CA07EF | | 21600 | LBNZ | VALVE |
| 07C8 | 88 | | 21610 | GLO | FLAG |
| 07C9 | FA28 | | 21620 | ANI | OCF |
| 07CB | C207EF | | 21630 | LBZ | VALVE |
| 07CE | 88 | | 21640 | GLO | FLAG |
| 07CF | FAD7 | | 21650 | ANI | NOCF |
| 07D1 | A8 | | 21660 | PLO | FLAG |
| 07D2 | F85A | | 21670 | LDI | #.90 |
| 07D4 | B6 | | 21680 | PHI | VLVTMR |
| 07D5 | 6E | | 21690 | INP | SW |
| 07D6 | FA80 | | 21700 | ANI | VLVDLY |
| 07D8 | 32E7 | | 21710 | BZ | V60 |
| 07DA | F81E | | 21720 | LDI | #.30 |
| 07DC | B6 | | 21730 | PHI | VLVTMR |
| 07DD | 69 | | 21740 | INP | SWOPT |
| 07DE | FA80 | | 21750 | ANI | VLVDLYB |
| 07E0 | 32EF | | 21760 | BZ | VALVE |
| 07E2 | F805 | | 21770 | LDI | #5 |
| 07E4 | B6 | | 21780 | PHI | VLVTMR |
| 07E5 | 30EF | | 21790 | BR | VALVE |
| 07E7 | 69 | 21800 V60 | INP | SWOPT |
| 07E8 | FA80 | | 21810 | ANI | VLVDLYB |
| 07EA | 32EF | | 21820 | BZ | VALVE |
| 07EC | F83C | | 21830 | LDI | #.60 |
| 07EE | B6 | | 21840 | PHI | VLVTMR |
| 07EF | D3 | 21850 VALVE | SEP | PC |
| 07F0 | F803 | | 21860 | LDI | A.0/TEMPOUT |
| 07F2 | AE | | 21870 | PLO | UTILP1 |
| 07F3 | F8A1 | | 21880 | LDI | A.1/TEMPOUT |
| 07F5 | BE | | 21890 | PHI | UTILP1 |
| 07F6 | EE | | 21900 | SEX | UTILP1 |
| 07F7 | 9B | | 21910 | GHI | FLAG |
| 07F8 | FE | | 21920 | SHL | |
| 07F9 | F85F | | 21930 | LDI | #.95 |
| 07FB | C7 | | 21940 | LSNF | |
| 07FC | F83A | | 21950 | LDI | #.58 |
| 07FE | F7 | | 21960 | SM | |
| 07FF | E2 | | 21970 | SEX | SP |
| 0800 | A9 | | 21980 | PLO | MQ |
| 0801 | C30808 | | 21990 | LBDF | *,+7 |
| 0804 | 9B | | 22000 | GHI | FLAG |
| 0805 | FABF | | 22010 | ANI | NHTOR |
| 0807 | BB | | 22020 | PHI | FLAG |
| 0808 | 6C | | 22030 | INP | RIOWR |
| 0809 | FC12 | | 22040 | ADI | A.0/RIOCNT |
| 080B | AA | | 22050 | PLO | UTILP2 |
| 080C | F800 | | 22060 | LDI | #0 |
| 080E | 7C0D | | 22070 | ADCI | A.1/RIOCNT |
| 0810 | BA | | 22080 | PHI | UTILP2 |
| 0811 | 0A | | 22090 | LDN | UTILP2 |
| 0812 | 52 | | 22100 | STR | SP |

| | | | | | |
|---|---|---|---|---|---|
| 0813 | F81B | 22110 | | LDI | A.0/MULT |
| 0815 | A5 | 22120 | | PLO | SUBSUB |
| 0816 | F80C | 22130 | | LDI | A.1/MULT |
| 0818 | B5 | 22140 | | PHI | SUBSUB |
| 0819 | D5 | 22150 | | SEP | SUBSUB |
| 081A | 89 | 22160 | | GLO | MQ |
| 081B | FE | 22170 | | SHL | |
| 081C | A9 | 22180 | | PLO | MQ |
| 081D | 99 | 22190 | | GHI | MQ |
| 081E | 7E | 22200 | | SHLC | |
| 081F | 3327 | 22210 | | BDF | MAX |
| 0821 | B9 | 22220 | | PHI | MQ |
| 0822 | 89 | 22230 | | GLO | MQ |
| 0823 | FE | 22240 | | SHL | |
| 0824 | 99 | 22250 | | GHI | MQ |
| 0825 | 7E | 22260 | | SHLC | |
| 0826 | C7 | 22270 | | LSNF | |
| 0827 | F8FF | 22280 | MAX | LDI | #FF |
| 0829 | 52 | 22290 | | STR | SP |
| 082A | 98 | 22300 | | GHI | FLAG |
| 082B | FE | 22310 | | SHL | |
| 082C | F826 | 22320 | | LDI | #.38 |
| 082E | C7 | 22330 | | LSNF | |
| 082F | F806 | 22340 | | LDI | #.6 |
| 0831 | F4 | 22350 | | ADD | |
| 0832 | A0 | 22360 | | PLO | TEMP |
| 0833 | F800 | 22370 | | LDI | #0 |
| 0835 | 7C00 | 22380 | | ADCI | #0 |
| 0837 | B0 | 22390 | | PHI | TEMP |
| 0838 | F801 | 22400 | | LDI | A.0/A-D |
| 083A | A5 | 22410 | | PLO | SUBSUB |
| 083B | F80C | 22420 | | LDI | A.1/A-D |
| 083D | B5 | 22430 | | PHI | SUBSUB |
| 083E | F8FD | 22440 | | LDI | FTMSK |
| 0840 | D5 | 22450 | | SEP | SUBSUB |
| 0841 | 02 | 22460 | | LDN | SP |
| 0842 | A9 | 22470 | | PLO | MQ |
| 0843 | F800 | 22480 | | LDI | #0 |
| 0845 | B9 | 22490 | | PHI | MQ |
| 0846 | F803 | 22500 | | LDI | #3 |
| 0848 | 52 | 22510 | | STR | SP |
| 0849 | F834 | 22520 | | LDI | A.0/DIV |
| 084B | A5 | 22530 | | PLO | SUBSUB |
| 084C | F80C | 22540 | | LDI | A.1/DIV |
| 084E | B5 | 22550 | | PHI | SUBSUB |
| 084F | D5 | 22560 | | SEP | SUBSUB |
| 0850 | 98 | 22570 | | GHI | FLAG |
| 0851 | FE | 22580 | | SHL | |
| 0852 | 89 | 22590 | | GLO | MQ |
| 0853 | C7 | 22600 | | LSNF | |
| 0854 | F6 | 22610 | | SHR | |
| 0855 | C4 | 22620 | | NOP | |
| 0856 | 52 | 22630 | | STR | SP |
| 0857 | F801 | 22640 | | LDI | A.0/A-D |
| 0859 | A5 | 22650 | | PLO | SUBSUB |
| 085A | F80C | 22660 | | LDI | A.1/A-D |
| 085C | B5 | 22670 | | PHI | SUBSUB |
| 085D | 80 | 22680 | | GLO | TEMP |
| 085E | F4 | 22690 | | ADD | |
| 085F | A0 | 22700 | | PLO | TEMP |
| 0860 | 90 | 22710 | | GHI | TEMP |
| 0861 | 7C00 | 22720 | | ADCI | #0 |
| 0863 | B0 | 22730 | | PHI | TEMP |
| 0864 | 88 | 22740 | | GLO | FLAG |
| 0865 | FA02 | 22750 | | ANI | DNFC |
| 0867 | CA08B4 | 22760 | | LBNZ | BOOST |
| 086A | F8E4 | 22770 | | LDI | A.0/DAY3 |

| | | | | | |
|---|---|---|---|---|---|
| 086C | AA | 22780 | | PLO | UTILP2 |
| 086D | F830 | 22790 | | LDI | A.1/DAY3 |
| 086F | BA | 22800 | | PHI | UTILP2 |
| 0870 | 0A | 22810 | | LDN | UTILP2 |
| 0871 | F6 | 22820 | | SHR | |
| 0872 | 76 | 22830 | | SHRC | |
| 0873 | 76 | 22840 | | SHRC | |
| 0874 | 76 | 22850 | | SHRC | |
| 0875 | F902 | 22860 | | ORI | #2 |
| 0877 | AA | 22870 | | PLO | UTILP2 |
| 0878 | F830 | 22880 | | LDI | A.1/RAM |
| 087A | BA | 22890 | | PHI | UTILP2 |
| 087B | 0A | 22900 | LHLP | LDN | UTILP2 |
| 087C | CA088C | 22910 | | LBNZ | NORMAL |
| 087F | 8A | 22920 | | GLO | UTILP2 |
| 0880 | FC04 | 22930 | | ADI | #4 |
| 0882 | AA | 22940 | | PLO | UTILP2 |
| 0883 | FA1C | 22950 | | ANI | #1C |
| 0885 | CA087B | 22960 | | LBNZ | LHLP |
| 0888 | F800 | 22970 | | LDI | #0 |
| 088A | 3090 | 22980 | | BR | LOHEAT |
| 088C | F8F7 | 22990 | NORMAL | LDI | NITMSK |
| 088E | D5 | 23000 | | SEP | SUBSUB |
| 088F | 02 | 23010 | | LDN | SF |
| 0890 | FBFF | 23020 | LOHEAT | XRI | #FF |
| 0892 | A9 | 23030 | | PLO | MQ |
| 0893 | F800 | 23040 | | LDI | #0 |
| 0895 | B9 | 23050 | | PHI | MQ |
| 0896 | F803 | 23060 | | LDI | #3 |
| 0898 | 52 | 23070 | | STR | SF |
| 0899 | F834 | 23080 | | LDI | A.0/DIV |
| 089B | A5 | 23090 | | PLO | SUBSUB |
| 089C | F80C | 23100 | | LDI | A.1/DIV |
| 089E | B5 | 23110 | | PHI | SUBSUB |
| 089F | D5 | 23120 | | SEP | SUBSUB |
| 08A0 | 9E | 23130 | | GHI | FLAG |
| 08A1 | FE | 23140 | | SHL | |
| 08A2 | 89 | 23150 | | GLO | MQ |
| 08A3 | C7 | 23160 | | LSNF | |
| 08A4 | C4 | 23170 | | NOP | |
| 08A5 | F6 | 23180 | | SHR | |
| 08A6 | 52 | 23190 | | STR | SF |
| 08A7 | 80 | 23200 | | GLO | TEMP |
| 08A8 | F7 | 23210 | | SM | |
| 08A9 | A0 | 23220 | | PLO | TEMP |
| 08AA | 33DE | 23230 | | BDF | NOCAR |
| 08AC | 90 | 23240 | | GHI | TEMP |
| 08AD | 3AE4 | 23250 | | BNZ | OKAY |
| 08AF | F800 | 23260 | | LDI | #0 |
| 08B1 | AC | 23270 | | PLO | TEMP |
| 08B2 | 30E4 | 23280 | | BR | OKAY |
| 08B4 | 8C | 23290 | BOOST | GLO | BSTHR |
| 08B5 | 32DE | 23300 | | BZ | NOCAR |
| 08B7 | 9E | 23310 | | GHI | FLAG |
| 08B8 | FE | 23320 | | SHL | |
| 08B9 | F80A | 23330 | | LDI | #.10 |
| 08BB | C7 | 23340 | | LSNF | |
| 08BC | F806 | 23350 | | LDI | #.6 |
| 08BE | AB | 23360 | | PLO | UTIL |
| 08BF | 69 | 23370 | | INP | SWOPT |
| 08C0 | FA02 | 23380 | | ANI | AUTMSK |
| 08C2 | FF01 | 23390 | | SMI | #1 |
| 08C4 | 8B | 23400 | | GLO | UTIL |
| 08C5 | 52 | 23410 | | STR | SF |
| 08C6 | 3BD9 | 23420 | | BNF | SUM |
| 08C8 | F8FE | 23430 | | LDI | BSTMSK |
| 08CA | D5 | 23440 | | SEP | SUBSUB |
| 08CB | 02 | 23450 | | LDN | SF |

| | | | | |
|---|---|---|---|---|
| 08CC | F6 | 23460 | | SHR |
| 08CD | F6 | 23470 | | SHR |
| 08CE | F6 | 23480 | | SHR |
| 08CF | 52 | 23490 | | STR | SF |
| 08D0 | 98 | 23500 | | GHI | FLAG |
| 08D1 | FE | 23510 | | SHL | |
| 08D2 | 02 | 23520 | | LDN | SF |
| 08D3 | C7 | 23530 | | LSNF | |
| 08D4 | F6 | 23540 | | SHR | |
| 08D5 | 52 | 23550 | | STR | SF |
| 08D6 | C6 | 23560 | | LSNZ | |
| 08D7 | AC | 23570 | | PLO | RSTMR |
| 08D8 | C4 | 23580 | | NOP | |
| 08D9 | 80 | 23590 | SUM | GLO | TEMP |
| 08DA | F4 | 23600 | | ADD | |
| 08DB | A0 | 23610 | | PLO | TEMP |
| 08DC | 33E1 | 23620 | | BDF | OVER |
| 08DE | 90 | 23630 | NOCAR | GHI | TEMP |
| 08DF | 32E4 | 23640 | | BZ | OKAY |
| 08E1 | F8FF | 23650 | OVER | LDI | #FF |
| 08E3 | A0 | 23660 | | PLO | TEMP |
| 08E4 | E2 | 23670 | OKAY | SEX | SF |
| 08E5 | F802 | 23680 | | LDI | A.0/TEMPIN |
| 08E7 | AE | 23690 | | PLO | UTILP1 |
| 08E8 | F8A0 | 23700 | | LDI | A.1/TEMPIN |
| 08EA | BE | 23710 | | PHI | UTILP1 |
| 08EB | 9E | 23720 | | GHI | FLAG |
| 08EC | FA40 | 23730 | | ANI | HTON |
| 08EE | 3AF3 | 23740 | | BNZ | *,+5 |
| 08F0 | F800 | 23750 | | LDI | #0 |
| 08F2 | A0 | 23760 | | PLO | TEMP |
| 08F3 | 98 | 23770 | | GHI | FLAG |
| 08F4 | FE | 23780 | | SHL | |
| 08F5 | F846 | 23790 | | LDI | #.70 |
| 08F7 | C7 | 23800 | | LSNF | |
| 08F8 | F814 | 23810 | | LDI | #.20 |
| 08FA | 52 | 23820 | | STR | SF |
| 08FB | 80 | 23830 | | GLO | TEMP |
| 08FC | F7 | 23840 | | SM | |
| 08FD | 80 | 23850 | | GLO | TEMP |
| 08FE | CF | 23860 | | LSDF | |
| 08FF | 02 | 23870 | | LDN | SF |
| 0900 | A0 | 23880 | | PLO | TEMP |
| 0901 | F8A0 | 23890 | | LDI | A.1/TGT |
| 0903 | BA | 23900 | | PHI | UTILP2 |
| 0904 | F800 | 23910 | | LDI | A.0/TGT |
| 0906 | AA | 23920 | | PLO | UTILP2 |
| 0907 | 80 | 23930 | | GLO | TEMP |
| 0908 | 5A | 23940 | | STR | UTILP2 |
| 0909 | 88 | 23950 | | GLO | FLAG |
| 090A | FA10 | 23960 | | ANI | PMPMSK |
| 090C | C20A2C | 23970 | | LBZ | HIT |
| 090F | 6E | 23980 | | INP | SW |
| 0910 | FA20 | 23990 | | ANI | UK |
| 0912 | 321F | 24000 | | BZ | NOTUK |
| 0914 | 98 | 24010 | | GHI | FLAG |
| 0915 | FA20 | 24020 | | ANI | BURNBIT |
| 0917 | 3A1F | 24030 | | BNZ | NOTUK |
| 0919 | 88 | 24040 | | GLO | FLAG |
| 091A | FAD7 | 24050 | | ANI | NOCF |
| 091C | C0096E | 24060 | | LBR | CLOSE,+1 |
| 091F | 96 | 24070 | NOTUK | GHI | VLVTMR |
| 0920 | FF01 | 24080 | | SMI | #1 |
| 0922 | 88 | 24090 | | GLO | FLAG |
| 0923 | FA28 | 24100 | | ANI | OCF |
| 0925 | 3B2C | 24110 | | BNF | *,+7 |
| 0927 | C209A5 | 24120 | | LBZ | PUMP |

| | | | | |
|---|---|---|---|---|
| 092A | 302F | 24130 | BR | *,+5 |
| 092C | CA09A5 | 24140 | LBNZ | PUMP |
| 092F | EE | 24150 | SEX | UTILP1 |
| 0930 | 80 | 24160 | GLO | TEMP |
| 0931 | F5 | 24170 | SD | |
| 0932 | C20A2C | 24180 | LBZ | HIT |
| 0935 | FC01 | 24190 | ADI | #1 |
| 0937 | C20A2C | 24200 | LBZ | HIT |
| 093A | FF02 | 24210 | SMI | #2 |
| 093C | C20A2C | 24220 | LBZ | HIT |
| 093F | 80 | 24230 | GLO | TEMP |
| 0940 | F5 | 24240 | SD | |
| 0941 | CB0974 | 24250 | LBNF | OP1 |
| 0944 | 88 | 24260 | GLO | FLAG |
| 0945 | FA20 | 24270 | ANI | OPNFLG |
| 0947 | CA0A2C | 24280 | LBNZ | HIT |
| 094A | 96 | 24290 | GHI | VLVTMR |
| 094B | CA09A5 | 24300 | LBNZ | PUMP |
| 094E | 80 | 24310 | GLO | TEMP |
| 094F | F5 | 24320 | SD | |
| 0950 | E2 | 24330 | SEX | SP |
| 0951 | 52 | 24340 | STR | SP |
| 0952 | 98 | 24350 | GHI | FLAG |
| 0953 | FE | 24360 | SHL | |
| 0954 | F805 | 24370 | LDI | #5 |
| 0956 | C7 | 24380 | LSNF | |
| 0957 | F803 | 24390 | LDI | #3 |
| 0959 | F5 | 24400 | SD | |
| 095A | EE | 24410 | SEX | UTILP1 |
| 095B | 3363 | 24420 | BDF | *,+8 |
| 095D | 98 | 24430 | GHI | FLAG |
| 095E | FA08 | 24440 | ANI | RANGE5 |
| 0960 | CA0A2C | 24450 | LBNZ | HIT |
| 0963 | FC01 | 24460 | ADI | #1 |
| 0965 | FF0F | 24470 | SMI | #F |
| 0967 | C7 | 24480 | LSNF | |
| 0968 | F800 | 24490 | LDI | #0 |
| 096A | FC0F | 24500 | ADI | #F |
| 096C | B6 | 24510 | PHI | VLVTMR |
| 096D | 88 | 24520 CLOSE | GLO | FLAG |
| 096E | F908 | 24530 | ORI | CLSFLG |
| 0970 | A8 | 24540 | PLO | FLAG |
| 0971 | C009A1 | 24550 | LBR | RANGE1 |
| 0974 | 88 | 24560 OP1 | GLO | FLAG |
| 0975 | FA08 | 24570 | ANI | CLSFLG |
| 0977 | CA0A2C | 24580 | LBNZ | HIT |
| 097A | 96 | 24590 | GHI | VLVTMR |
| 097B | CA09A5 | 24600 | LBNZ | PUMP |
| 097E | 80 | 24610 | GLO | TEMP |
| 097F | F7 | 24620 | SM | |
| 0980 | E2 | 24630 | SEX | SP |
| 0981 | 52 | 24640 | STR | SP |
| 0982 | 98 | 24650 | GHI | FLAG |
| 0983 | FE | 24660 | SHL | |
| 0984 | F805 | 24670 | LDI | #5 |
| 0986 | C7 | 24680 | LSNF | |
| 0987 | F803 | 24690 | LDI | #3 |
| 0989 | F5 | 24700 | SD | |
| 098A | EE | 24710 | SEX | UTILP1 |
| 098B | 3393 | 24720 | BDF | *,+8 |
| 098D | 98 | 24730 | GHI | FLAG |
| 098E | FA08 | 24740 | ANI | RANGE5 |
| 0990 | CA0A2C | 24750 | LBNZ | HIT |
| 0993 | FC01 | 24760 | ADI | #1 |
| 0995 | FF0F | 24770 | SMI | #F |
| 0997 | C7 | 24780 | LSNF | |
| 0998 | F800 | 24790 | LDI | #0 |
| 099A | FC0F | 24800 | ADI | #F |

| | | | | |
|---|---|---|---|---|
| 099C | B6 | 24810 | PHI | VLVTMP |
| 099D | 88 | 24820 OPN | GLO | FLAG |
| 099E | F920 | 24830 | ORI | OPNFLG |
| 09A0 | A8 | 24840 | PLO | FLAG |
| 09A1 | 98 | 24850 RANGE1 | GHI | FLAG |
| 09A2 | FAF7 | 24860 | ANI | NRANGES |
| 09A4 | B8 | 24870 | PHI | FLAG |
| 09A5 | D3 | 24880 PUMP | SEP | PC |
| 09A6 | E2 | 24890 | SEX | SP |
| 09A7 | F801 | 24900 | LDI | A.0/A-D |
| 09A9 | A5 | 24910 | PLO | SUBSUB |
| 09AA | F80C | 24920 | LDI | A.1/A-D |
| 09AC | B5 | 24930 | PHI | SUBSUB |
| 09AD | F803 | 24940 | LDI | A.0/TEMPOUT |
| 09AF | A8 | 24950 | PLO | UTILP1 |
| 09B0 | F8AC | 24960 | LDI | A.1/TEMPOUT |
| 09B2 | B8 | 24970 | PHI | UTILP1 |
| 09B3 | 6A | 24980 | INP | PMPWL |
| 09B4 | C20A21 | 24990 | LBZ | PMPOFF |
| 09B7 | FF0F | 25000 | SMI | #F |
| 09B9 | C30A26 | 25010 | LBDF | PMPON |
| 09BC | 69 | 25020 | INP | SWOPT |
| 09BD | FA08 | 25030 | ANI | WINTER |
| 09BF | C20A21 | 25040 | LBZ | PMPOFF |
| 09C2 | 6A | 25050 | INP | PMPWL |
| 09C3 | 98 | 25060 | GHI | FLAG |
| 09C4 | FE | 25070 | SHL | |
| 09C5 | 02 | 25080 | LDN | SP |
| 09C6 | 3BD1 | 25090 | BNF | FCHT |
| 09C8 | FC2C | 25100 | ADI | A.0/CPMPCHT |
| 09CA | AA | 25110 | PLO | UTILP2 |
| 09CB | F800 | 25120 | LDI | #0 |
| 09CD | 7C0D | 25130 | ADCI | A.1/CPMPCHT |
| 09CF | 30D8 | 25140 | BR | AFCHT |
| 09D1 | FC1C | 25150 FCHT | ADI | A.0/PMPCHT |
| 09D3 | AA | 25160 | PLO | UTILP2 |
| 09D4 | F800 | 25170 | LDI | #0 |
| 09D6 | 7C0D | 25180 | ADCI | A.1/PMPCHT |
| 09D8 | BA | 25190 AFCHT | PHI | UTILP2 |
| 09D9 | 6E | 25200 | INP | SP |
| 09DA | FA20 | 25210 | ANI | UN |
| 09DC | C20A12 | 25220 | LBZ | DAYPMP |
| 09DF | 88 | 25230 | GLO | FLAG |
| 09E0 | FA02 | 25240 | ANI | DNFC |
| 09E2 | CA0A12 | 25250 | LBNZ | DAYPMP |
| 09E5 | 98 | 25260 | GHI | FLAG |
| 09E6 | FE | 25270 | SHL | |
| 09E7 | F819 | 25280 | LDI | #.25 |
| 09E9 | C7 | 25290 | LSNF | |
| 09EA | F6 | 25300 | SHR | |
| 09EB | C4 | 25310 | NOP | |
| 09EC | 52 | 25320 | STR | SP |
| 09ED | 0A | 25330 | LDN | UTILP2 |
| 09EE | F7 | 25340 | SM | |
| 09EF | EE | 25350 | SEX | UTILP1 |
| 09F0 | F7 | 25360 | SM | |
| 09F1 | C30A26 | 25370 | LBDF | PMPON |
| 09F4 | 52 | 25380 | STR | SP |
| 09F5 | 88 | 25390 | GLO | FLAG |
| 09F6 | FA10 | 25400 | ANI | PMPMSK |
| 09F8 | C20A3C | 25410 | LBZ | BURNER |
| 09FB | E2 | 25420 | SEX | SP |
| 09FC | 98 | 25430 | GHI | FLAG |
| 09FD | FE | 25440 | SHL | |
| 09FE | F802 | 25450 | LDI | #2 |
| 0A00 | C7 | 25460 | LSNF | |
| 0A01 | F801 | 25470 | LDI | #1 |
| 0A03 | F4 | 25480 | ADD | |

| | | | | |
|---|---|---|---|---|
| 0A04 | EE | 25490 | SEX | UTILP1 |
| 0A05 | C30A36 | 25500 | LBDF | BURNER |
| 0A08 | 2E | 25510 | DEC | UTILP1 |
| 0A09 | 80 | 25520 | GLO | TEMP |
| 0A0A | F7 | 25530 | SM | |
| 0A0B | 1E | 25540 | INC | UTILP1 |
| 0A0C | C30A21 | 25550 | LBDF | PMPOFF |
| 0A0F | C00A36 | 25560 | LBR | BURNER |
| 0A12 | EE | 25570 DAYPMP | SEX | UTILP1 |
| 0A13 | 88 | 25580 | GLO | FLAG |
| 0A14 | FA10 | 25590 | ANI | PMPMSK |
| 0A16 | CE | 25600 | LSZ | |
| 0A17 | F801 | 25610 | LDI | #1 |
| 0A19 | F5 | 25620 | SD | |
| 0A1A | CF | 25630 | LSDF | |
| 0A1B | F800 | 25640 | LDI | #0 |
| 0A1D | EA | 25650 | SEX | UTILP2 |
| 0A1E | F5 | 25660 | SD | |
| 0A1F | 3326 | 25670 | BDF | PMPON |
| 0A21 | 88 | 25680 PMPOFF | GLO | FLAG |
| 0A22 | FAEF | 25690 | ANI | NPMPMSK |
| 0A24 | 3029 | 25700 | BR | *,+5 |
| 0A26 | 88 | 25710 PMPON | GLO | FLAG |
| 0A27 | F910 | 25720 | ORI | PMPMSK |
| 0A29 | A8 | 25730 | PLO | FLAG |
| 0A2A | 3036 | 25740 | BR | BURNER |
| 0A2C | 98 | 25750 HIT | GHI | FLAG |
| 0A2D | F908 | 25760 | ORI | RANGES |
| 0A2F | B8 | 25770 | PHI | FLAG |
| 0A30 | F800 | 25780 | LDI | #0 |
| 0A32 | BE | 25790 | PHI | VLVTMR |
| 0A33 | C009A5 | 25800 | LBR | PUMP |
| 0A36 | E2 | 25810 BURNER | SEX | SP |
| 0A37 | F802 | 25820 | LDI | A.0/TEMPIN |
| 0A39 | AE | 25830 | PLO | UTILP1 |
| 0A3A | 6E | 25840 | INP | SW |
| 0A3B | FA04 | 25850 | ANI | BURNSW |
| 0A3D | 3272 | 25860 | BZ | BURNOFF |
| 0A3F | 6E | 25870 | INP | SW |
| 0A40 | FA20 | 25880 | ANI | UP |
| 0A42 | CA0A85 | 25890 | LBNZ | UPBURN |
| 0A45 | 69 | 25900 | INP | SWOPT |
| 0A46 | FA08 | 25910 | ANI | WINTER |
| 0A48 | 3272 | 25920 | BZ | BURNOFF |
| 0A4A | 88 | 25930 | GLO | FLAG |
| 0A4B | FA10 | 25940 | ANI | PMPMSK |
| 0A4D | 3272 | 25950 | BZ | BURNOFF |
| 0A4F | F8F4 | 25960 | LDI | DIFCMSK |
| 0A51 | D5 | 25970 | SEP | SUBSUB |
| 0A52 | 02 | 25980 | LDN | SP |
| 0A53 | F6 | 25990 | SHR | |
| 0A54 | F6 | 26000 | SHR | |
| 0A55 | F6 | 26010 | SHR | |
| 0A56 | F6 | 26020 | SHR | |
| 0A57 | FF02 | 26030 | SMI | #2 |
| 0A59 | CF | 26040 | LSDF | |
| 0A5A | F800 | 26050 | LDI | #0 |
| 0A5C | FC02 | 26060 | ADI | #2 |
| 0A5E | 52 | 26070 | STR | SP |
| 0A5F | 98 | 26080 | GHI | FLAG |
| 0A60 | FE | 26090 | SHL | |
| 0A61 | 02 | 26100 | LDN | SP |
| 0A62 | C7 | 26110 | LSNF | |
| 0A63 | F6 | 26120 | SHR | |
| 0A64 | 52 | 26130 | STR | SP |
| 0A65 | 98 | 26140 | GHI | FLAG |
| 0A66 | FA20 | 26150 | ANI | BURNBIT |
| 0A68 | C20A78 | 26160 | LBZ | DIF- |

| | | | | | |
|---|---|---|---|---|---|
| 0A6B | 80 | 26170 | | GLO | TEMP |
| 0A6C | F4 | 26180 | | ADD | |
| 0A6D | EE | 26190 | | SEX | UTILP1 |
| 0A6E | F7 | 26200 | | SM | |
| 0A6F | C30A82 | 26210 | | LBDF | BUEX |
| 0A72 | 98 | 26220 | BURNOFF | GHI | FLAG |
| 0A73 | FADF | 26230 | | ANI | NBURNBIT |
| 0A75 | C00A81 | 26240 | | LBR | BUEX,-1 |
| 0A78 | 80 | 26250 | DIF- | GLO | TEMP |
| 0A79 | F7 | 26260 | | SM | |
| 0A7A | EE | 26270 | | SEX | UTILP1 |
| 0A7B | F5 | 26280 | | SD | |
| 0A7C | 3382 | 26290 | | BDF | BUEX |
| 0A7E | 98 | 26300 | BURNON | GHI | FLAG |
| 0A7F | F920 | 26310 | | ORI | BURNBIT |
| 0A81 | B8 | 26320 | | PHI | FLAG |
| 0A82 | C001F6 | 26330 | BUEX | LBR | SUBSTART |
| 0A85 | 88 | 26340 | UNBURN | GLO | FLAG |
| 0A86 | FA02 | 26350 | | ANI | DIF- |
| 0A88 | CA0A7E | 26360 | | LBNZ | BURN |
| 0A8B | 98 | 26370 | | GHI | FLAG |
| 0A8C | FA40 | 26380 | | ANI | HTON |
| 0A8E | 3272 | 26390 | | BZ | BURNOFF |
| 0A90 | 6A | 26400 | | INP | PMPWL |
| 0A91 | C6 | 26410 | | LSNZ | |
| 0A92 | FC01 | 26420 | | ADI | #1 |
| 0A94 | 52 | 26430 | | STR | SP |
| 0A95 | 98 | 26440 | | GHI | FLAG |
| 0A96 | FE | 26450 | | SHL | |
| 0A97 | 02 | 26460 | | LDN | SP |
| 0A98 | CB0AA4 | 26470 | | LBNF | FCHT2 |
| 0A9B | FC2C | 26480 | | ADI | A.0/PMPCHT |
| 0A9D | AA | 26490 | | PLO | UTILP2 |
| 0A9E | F80D | 26500 | | LDI | A.1/PMPCHT |
| 0AA0 | 7C00 | 26510 | | ADCI | #0 |
| 0AA2 | 30AB | 26520 | | BR | AFCHT2 |
| 0AA4 | FC1C | 26530 | FCHT2 | ADI | A.0/PMPCHT |
| 0AA6 | AA | 26540 | | PLO | UTILP2 |
| 0AA7 | F80D | 26550 | | LDI | A.1/PMPCHT |
| 0AA9 | 7C00 | 26560 | | ADCI | #0 |
| 0AAB | BA | 26570 | AFCHT2 | PHI | UTILP2 |
| 0AAC | F8F4 | 26580 | | LDI | DIFCMSK |
| 0AAE | D5 | 26590 | | SEP | SUBSUB |
| 0AAF | 02 | 26600 | | LDN | SP |
| 0AB0 | F6 | 26610 | | SHR | |
| 0AB1 | F6 | 26620 | | SHR | |
| 0AB2 | F6 | 26630 | | SHR | |
| 0AB3 | FC19 | 26640 | | ADI | A.2 |
| 0AB5 | 52 | 26650 | | STR | SP |
| 0AB6 | 98 | 26660 | | GHI | FLAG |
| 0AB7 | FE | 26670 | | SHL | |
| 0AB8 | 02 | 26680 | | LDN | SP |
| 0AB9 | C7 | 26690 | | LSNF | |
| 0ABA | F6 | 26700 | | SHR | |
| 0ABB | 52 | 26710 | | STR | SP |
| 0ABC | 0A | 26720 | | LDN | UTILP2 |
| 0ABD | F7 | 26730 | | SM | |
| 0ABE | 52 | 26740 | | STR | SP |
| 0ABF | 1E | 26750 | | INC | UTILP1 |
| 0AC0 | 0E | 26760 | | LDN | UTILP1 |
| 0AC1 | F5 | 26770 | | SD | |
| 0AC2 | C30A7E | 26780 | | LBDF | BURNON |
| 0AC5 | 52 | 26790 | | STR | SP |
| 0AC6 | 98 | 26800 | | GHI | FLAG |
| 0AC7 | FE | 26810 | | SHL | |
| 0AC8 | F802 | 26820 | | LDI | #2 |
| 0ACA | C7 | 26830 | | LSNF | |

| | | | | |
|---|---|---|---|---|
| 0ACB | F801 | 26840 | LDI | #1 |
| 0ACD | F4 | 26850 | ADD | |
| 0ACE | CB0A72 | 26860 | LBNF | BURNOFF |
| 0AD1 | C00A82 | 26870 | LBR | RDEX |
| 0AD4 | C0004C | 26880 RTURN | LBR | RESTRT |
| 0AD7 | F8FF | 26890 PWIN | LDI | #FF |
| 0AD9 | 52 | 26900 | STR | SP |
| 0ADA | 63 | 26910 | OUT | DIGPT |
| 0ADB | 22 | 26920 | DEC | SP |
| 0ADC | 62 | 26930 | OUT | SEGPT |
| 0ADD | 22 | 26940 | DEC | SP |
| 0ADE | 66 | 26950 | OUT | CONTR |
| 0ADF | F850 | 26960 | LDI | #.80 |
| 0AE1 | FF01 | 26970 | SMI | #1 |
| 0AE3 | 3DD4 | 26980 | BNZ | RTURN |
| 0AE5 | 3AE1 | 26990 | BNZ | *,-4 |
| 0AE7 | F83C | 27000 | LDI | A.0/DATA |
| 0AE9 | AE | 27010 | PLO | UTILP1 |
| 0AEA | F80D | 27020 | LDI | A.1/DATA |
| 0AEC | BE | 27030 | PHI | UTILP1 |
| 0AED | F840 | 27040 | LDI | A.1/CRAM |
| 0AEF | B4 | 27050 | PHI | SUB |
| 0AF0 | F819 | 27060 | LDI | A.0/CRAM,+&H19 |
| 0AF2 | A4 | 27070 | PLO | SUB |
| 0AF3 | E4 | 27080 | SEX | SUB |
| 0AF4 | 4E | 27090 | LDA | UTILP1 |
| 0AF5 | 73 | 27100 | STXD | |
| 0AF6 | 84 | 27110 | GLO | SUB |
| 0AF7 | CA0AF4 | 27120 | LBNZ | *,-3 |
| 0AFA | 4E | 27130 | LDA | UTILP1 |
| 0AFB | 54 | 27140 | STR | SUB |
| 0AFC | F800 | 27150 | LDI | #0 |
| 0AFE | A9 | 27160 | PLO | MQ |
| 0AFF | B9 | 27170 | PHI | MQ |
| 0B00 | 9D | 27180 | GHI | HZCNTR |
| 0B01 | AE | 27190 | PLO | UTILP1 |
| 0B02 | 3D8D | 27200 | BNZ | RTURN2 |
| 0B04 | D4 | 27210 | SEP | SUB |
| 0B05 | F81C | 27220 | LDI | A.0/STACK |
| 0B07 | A2 | 27230 | PLO | SP |
| 0B08 | F8A0 | 27240 | LDI | A.1/STACK |
| 0B0A | B2 | 27250 | PHI | SP |
| 0B0B | 8E | 27260 | GLO | UTILP1 |
| 0B0C | BD | 27270 | PHI | HZCNTR |
| 0B0D | E2 | 27280 | SEX | SP |
| 0B0E | F805 | 27290 | LDI | #.5 |
| 0B10 | B6 | 27300 | PHI | VLVTMR |
| 0B11 | 88 | 27310 | GLO | FLAG |
| 0B12 | FAD7 | 27320 | ANI | NOCF |
| 0B14 | A8 | 27330 | PLO | FLAG |
| 0B15 | F81C | 27340 | LDI | A.0/RDAY |
| 0B17 | A4 | 27350 | PLO | SUB |
| 0B18 | F80B | 27360 | LDI | A.1/RDAY |
| 0B1A | B4 | 27370 | PHI | SUB |
| 0B1B | D4 | 27380 | SEP | SUB |
| 0B1C | 89 | 27390 RDAY | GLO | MQ |
| 0B1D | FFA0 | 27400 | SMI | #.160 |
| 0B1F | A9 | 27410 | PLO | MQ |
| 0B20 | 99 | 27420 | GHI | MQ |
| 0B21 | 7F05 | 27430 | SMBI | #5 |
| 0B23 | CB0B3C | 27440 | LBNF | RHR |
| 0B26 | B9 | 27450 | PHI | MQ |
| 0B27 | F8FF | 27460 | LDI | A.0/INCDAY |
| 0B29 | A5 | 27470 | PLO | SUBSUB |
| 0B2A | F80D | 27480 | LDI | A.1/INCDAY |
| 0B2C | B5 | 27490 | PHI | SUBSUB |
| 0B2D | D5 | 27500 | SEP | SUBSUB |
| 0B2E | F852 | 27510 | LDI | A.0/SUB4 |

| | | | | |
|---|---|---|---|---|
| 0B30 | A5 | 27520 | PLO | SUBSUB |
| 0B31 | F80C | 27530 | LDI | A.1/SUB4 |
| 0B33 | B5 | 27540 | PHI | SUBSUB |
| 0B34 | 22 | 27550 | DEC | SP |
| 0B35 | F8FF | 27560 | LDI | #FF |
| 0B37 | 52 | 27570 | STR | SP |
| 0B38 | D5 | 27580 | SEP | SUBSUB |
| 0B39 | C00B1C | 27590 | LBR | RDAY |
| 0B3C | F8E0 | 27600 RHR | LDI | A.0/TIME |
| 0B3E | AE | 27610 | PLO | UTILP1 |
| 0B3F | F830 | 27620 | LDI | A.1/TIME |
| 0B41 | BE | 27630 | PHI | UTILP1 |
| 0B42 | 89 | 27640 | GLO | MQ |
| 0B43 | FCA0 | 27650 | ADI | #.160 |
| 0B45 | A9 | 27660 | PLO | MQ |
| 0B46 | 89 | 27670 | GLO | MQ |
| 0B47 | FF3C | 27680 | SMI | #.60 |
| 0B49 | A9 | 27690 | PLO | MQ |
| 0B4A | 99 | 27700 | GHI | MQ |
| 0B4B | 7F00 | 27710 | SMBI | #0 |
| 0B4D | CB0B69 | 27720 | LBNF | RMIN |
| 0B50 | B9 | 27730 | PHI | MQ |
| 0B51 | F86D | 27740 | LDI | A.0/INCHRS |
| 0B53 | A5 | 27750 | PLO | SUBSUB |
| 0B54 | F80D | 27760 | LDI | A.1/INCHRS |
| 0B56 | B5 | 27770 | PHI | SUBSUB |
| 0B57 | D5 | 27780 | SEP | SUBSUB |
| 0B58 | C7 | 27790 | LSNF | |
| 0B59 | C4 | 27800 | NOP | |
| 0B5A | D5 | 27810 | SEP | SUBSUB |
| 0B5B | F852 | 27820 | LDI | A.0/SUB4 |
| 0B5D | A5 | 27830 | PLO | SUBSUB |
| 0B5E | F80C | 27840 | LDI | A.1/SUB4 |
| 0B60 | B5 | 27850 | PHI | SUBSUB |
| 0B61 | F83C | 27860 | LDI | #.60 |
| 0B63 | 22 | 27870 | DEC | SP |
| 0B64 | 52 | 27880 | STR | SP |
| 0B65 | D5 | 27890 | SEP | SUBSUB |
| 0B66 | C00B46 | 27900 | LBR | RHR,+10 |
| 0B69 | 89 | 27910 RMIN | GLO | MQ |
| 0B6A | FC3C | 27920 | ADI | #.60 |
| 0B6C | A9 | 27930 | PLO | MQ |
| 0B6D | 89 | 27940 | GLO | MQ |
| 0B6E | C2004C | 27950 | LBZ | RESTRT |
| 0B71 | 29 | 27960 | DEC | MQ |
| 0B72 | F856 | 27970 | LDI | A.0/INCMIN |
| 0B74 | A5 | 27980 | PLO | SUBSUB |
| 0B75 | F80D | 27990 | LDI | A.1/INCMIN |
| 0B77 | B5 | 28000 | PHI | SUBSUB |
| 0B78 | D5 | 28010 | SEP | SUBSUB |
| 0B79 | C7 | 28020 | LSNF | |
| 0B7A | C4 | 28030 | NOP | |
| 0B7B | D5 | 28040 | SEP | SUBSUB |
| 0B7C | C7 | 28050 | LSNF | |
| 0B7D | C4 | 28060 | NOP | |
| 0B7E | D5 | 28070 | SEP | SUBSUB |
| 0B7F | F852 | 28080 | LDI | A.0/SUB4 |
| 0B81 | A5 | 28090 | PLO | SUBSUB |
| 0B82 | F80C | 28100 | LDI | A.1/SUB4 |
| 0B84 | B5 | 28110 | PHI | SUBSUB |
| 0B85 | 22 | 28120 | DEC | SP |
| 0B86 | F801 | 28130 | LDI | #1 |
| 0B88 | 52 | 28140 | STR | SP |
| 0B89 | D5 | 28150 | SEP | SUBSUB |
| 0B8A | C00B6D | 28160 | LBR | RMIN,+4 |
| 0B8D | C0004C | 28170 RTURN2 | LBR | RESTRT |
| | | 28180 | ORG | #C00 |
| 0C00 | D4 | 28190 | SEP | SUB |

| | | | | | |
|---|---|---|---|---|---|
| 0C01 | E2 | 28200 | A-D | SEP | SP |
| 0C02 | 52 | 28210 | | STR | SP |
| 0C03 | 64 | 28220 | | OUT | ANASL |
| 0C04 | 22 | 28230 | | DEC | SP |
| 0C05 | F8FF | 28240 | | LDI | #FF |
| 0C07 | 52 | 28250 | | STR | SP |
| 0C08 | F880 | 28260 | | LDI | #80 |
| 0C0A | AB | 28270 | | PLO | UTIL |
| 0C0B | FE | 28280 | | SD | |
| 0C0C | 52 | 28290 | | STR | SP |
| 0C0D | 65 | 28300 | | OUT | LADDER |
| 0C0E | 22 | 28310 | | DEC | SP |
| 0C0F | 3E14 | 28320 | | BN3 | *,+5 |
| 0C11 | E2 | 28330 | | GLO | UTIL |
| 0C12 | F4 | 28340 | | ADD | |
| 0C13 | 52 | 28350 | | STR | SP |
| 0C14 | 8B | 28360 | | GLO | UTIL |
| 0C15 | F6 | 28370 | | SHR | |
| 0C16 | 3B0A | 28380 | | BNF | *,-12 |
| 0C18 | 3000 | 28390 | | BR | A-D,-1 |
| 0C1A | D4 | 28400 | FIN | SEP | SUB |
| 0C1B | F800 | 28410 | MULT | LDI | #0 |
| 0C1D | B9 | 28420 | | PHI | MQ |
| 0C1E | F6 | 28430 | | SHR | |
| 0C1F | F809 | 28440 | | LDI | #9 |
| 0C21 | AB | 28450 | | PLO | UTIL |
| 0C22 | E2 | 28460 | | SEX | SP |
| 0C23 | 2B | 28470 | MLP | DEC | UTIL |
| 0C24 | 99 | 28480 | | GHI | MQ |
| 0C25 | 76 | 28490 | | SHRC | |
| 0C26 | B9 | 28500 | | PHI | MQ |
| 0C27 | 89 | 28510 | | GLO | MQ |
| 0C28 | 76 | 28520 | | SHRC | |
| 0C29 | A9 | 28530 | | PLO | MQ |
| 0C2A | 8B | 28540 | | GLO | UTIL |
| 0C2B | 321A | 28550 | | BZ | FIN |
| 0C2D | 99 | 28560 | | GHI | MQ |
| 0C2E | C7 | 28570 | | LSNF | |
| 0C2F | F4 | 28580 | | ADD | |
| 0C30 | B9 | 28590 | | PHI | MQ |
| 0C31 | 3023 | 28600 | | BR | MLP |
| 0C33 | D4 | 28610 | DIVFIN | SEP | SUB |
| 0C34 | E2 | 28620 | DIV | SEX | SP |
| 0C35 | F809 | 28630 | | LDI | #9 |
| 0C37 | AB | 28640 | | PLO | UTIL |
| 0C38 | FE | 28650 | | SHL | |
| 0C39 | 2B | 28660 | DLP | DEC | UTIL |
| 0C3A | 99 | 28670 | | GHI | MQ |
| 0C3B | 3B40 | 28680 | | BNF | *,+5 |
| 0C3D | F7 | 28690 | | SM | |
| 0C3E | 3043 | 28700 | | BR | *,+5 |
| 0C40 | F7 | 28710 | | SM | |
| 0C41 | 3B47 | 28720 | | BNF | *,+6 |
| 0C43 | B9 | 28730 | | PHI | MQ |
| 0C44 | F801 | 28740 | | LDI | #1 |
| 0C46 | F6 | 28750 | | SHR | |
| 0C47 | 89 | 28760 | | GLO | MQ |
| 0C48 | 7E | 28770 | | SHLC | |
| 0C49 | A9 | 28780 | | PLO | MQ |
| 0C4A | 99 | 28790 | | GHI | MQ |
| 0C4B | 7E | 28800 | | SHLC | |
| 0C4C | B9 | 28810 | | PHI | MQ |
| 0C4D | 8B | 28820 | | GLO | UTIL |
| 0C4E | 3A39 | 28830 | | BNZ | DLP |
| 0C50 | 3033 | 28840 | | BR | DIVFIN |
| 0C52 | 8F | 28850 | SUB4 | GLO | RF |
| 0C53 | FFE0 | 28860 | | SMI | A.0/TIME |
| 0C55 | CA0C6E | 28870 | | LBNZ | EX5 |

| | | | | | |
|---|---|---|---|---|---|
| 0C58 | 8C | 28880 | | GLO | BSTMR |
| 0C59 | C20C62 | 28890 | | LBZ | BSTDEC1 |
| 0C5C | 8C | 28900 | | GLO | BSTMR |
| 0C5D | F7 | 28910 | | SM | |
| 0C5E | CF | 28920 | | LSDF | |
| 0C5F | F800 | 28930 | | LDI | #0 |
| 0C61 | AC | 28940 | | PLO | BSTMR |
| 0C62 | 9C | 28950 | BSTDEC1 | GHI | H1.5H |
| 0C63 | 326A | 28960 | | BZ | EX4 |
| 0C65 | F7 | 28970 | | SM | |
| 0C66 | CF | 28980 | | LSDF | |
| 0C67 | F800 | 28990 | | LDI | #0 |
| 0C69 | BC | 29000 | | PHI | H1.5H |
| 0C6A | 98 | 29010 | EX4 | GHI | FLAG |
| 0C6B | F904 | 29020 | | ORI | COINBIT |
| 0C6D | B8 | 29030 | | PHI | FLAG |
| 0C6E | 12 | 29040 | EX5 | INC | SP |
| 0C6F | D4 | 29050 | | SEP | SUB |
| | | 29060 | | ORG | #D00 |
| 0D00 | 42D72313961A0AD30212 | 29070 | | | |
| | | | 7SEG | DT | &H42,&HD7,&H23,&H13,&H96, |

&H1A,&HA,&HD3,&H2,&H12

| 0D0A | FF078F2AC22F0FAA | 29080 | | | |
| | | | | DT | &HFF,&H7,&H8F,&H2A,&HC7,& |

H2F,&HF,&HAA

| 0D12 | C080605040342B201610 | 29090 | | | |
| | | | RIOCHT | DT | &HC0,&H80,&H60,&H50,&H40, |

&H34,&H2B,&H20,&H16,&H10

| 0D1C | 004B50525456585A5C5E606264666868 | 29100 | | | |
| | | | PMPCHT | DT | 0,75,80,82,84,86,88,90,92 |

,94,96,98,100,102,104,104

| 0D2C | 002F32333435363738393A3B3C3D3E3E | 29110 | | | |
| | | | CPMPCHT | DT | 0,47,50,51,52,53,54,55,56 |

,57,58,59,60,61,62,62

| 0D3C | 003019AEC4F8003A8E1ED1 | 29120 | | | |
| | | | DATA | DT | 0,&H30,&H19,&HAE,&HC4,&HF |

8,&H0,&H3A,&H8E,&H1E,&HD1

| 0D47 | 1035063A7B9A2A7AC4AA | 29130 | | | |
| | | | | DT | &H10,&H35,&H6,&H3A,&H7B,& |

H9A,&H2A,&H7A,&HC4,&HAA

| 0D51 | C4F8BA4FF8 | 29140 | | | |
| | | | | DT | &HC4,&HF8,&HBA,&H4F,&HF8 |
| 0D56 | 0E | 29150 | INCMIN | LDN | UTILP1 |
| 0D57 | FF09 | 29160 | | SMI | #9 |
| 0D59 | 335F | 29170 | | BDF | *,+6 |
| 0D5B | FC06 | 29180 | | ADI | #6 |
| 0D5D | FE | 29190 | | SHL | |
| 0D5E | 76 | 29200 | | SHRC | |
| 0D5F | 5E | 29210 | | STR | UTILP1 |
| 0D60 | 1E | 29220 | | INC | UTILP1 |
| 0D61 | 0E | 29230 | | LDN | UTILP1 |
| 0D62 | 7F05 | 29240 | | SMBI | #5 |
| 0D64 | 336A | 29250 | | BDF | *,+6 |
| 0D66 | FC06 | 29260 | | ADI | #6 |
| 0D68 | FE | 29270 | | SHL | |
| 0D69 | 76 | 29280 | | SHRC | |
| 0D6A | 5E | 29290 | | STR | UTILP1 |
| 0D6B | 2E | 29300 | | DEC | UTILP1 |
| 0D6C | D4 | 29310 | | SEP | SUB |
| 0D6D | 1E | 29320 | INCHRS | INC | UTILP1 |
| 0D6E | 1E | 29330 | | INC | UTILP1 |
| 0D6F | 0E | 29340 | | LDN | UTILP1 |
| 0D70 | FF0C | 29350 | | SMI | #C |
| 0D72 | CF | 29360 | | LSDF | |
| 0D73 | FC0C | 29370 | | ADI | #C |
| 0D75 | FF0B | 29380 | | SMI | #B |
| 0D77 | 3B7F | 29390 | | BNF | *,+8 |

| | | | | | |
|---|---|---|---|---|---|
| 0D79 | FF00 | 29400 | | SMI | #0 |
| 0D7B | F80C | 29410 | | LDI | #C |
| 0D7D | 3083 | 29420 | | BR | *,+6 |
| 0D7F | FC0C | 29430 | | ADI | #C |
| 0D81 | FE | 29440 | | SHL | |
| 0D82 | 76 | 29450 | | SHRC | |
| 0D83 | 5E | 29460 | | STR | UTILP1 |
| 0D84 | 1E | 29470 | | INC | UTILP1 |
| 0D85 | 0E | 29480 | | LDN | UTILP1 |
| 0D86 | 7CFE | 29490 | | ADCI | #FE |
| 0D88 | FA01 | 29500 | | ANI | #1 |
| 0D8A | 5E | 29510 | | STR | UTILP1 |
| 0D8B | 2E | 29520 | | DEC | UTILP1 |
| 0D8C | 2E | 29530 | | DEC | UTILP1 |
| 0D8D | 2E | 29540 | | DEC | UTILP1 |
| 0D8E | D4 | 29550 | | SEP | SUB |
| 0D8F | F8£4 | 29560 | INCDAY | LDI | A.0/DAY3 |
| 0D91 | AA | 29570 | | PLO | UTILP2 |
| 0D92 | F830 | 29580 | | LDI | A.1/DAY3 |
| 0D94 | BA | 29590 | | PHI | UTILP2 |
| 0D95 | 0A | 29600 | | LDN | . UTILP2 |
| 0D96 | FF06 | 29610 | | SMI | #6 |
| 0D98 | CF | 29620 | | LSDF | |
| 0D99 | FC07 | 29630 | | ADI | #7 |
| 0D9B | 5A | 29640 | | STR | UTILP2 |
| 0D9C | D4 | 29650 | | SEP | SUB |
| 0D9D | FBFEBFF7EFF7EDFFF | 29660 | | | |
| | | | DAYCHT | DT | &HFB,&HFE,&HBF,&HF7,&HEF, &H7F,&HDF,&HFF |
| 0DA5 | FDFBF7BFFEEF7FDF | 29670 | | | |
| | | | SCANCHT | DT | &HFD,&HFB,&HF7,&HBF,&HFE, &HEF,&H7F,&HDF |
| 0DAD | 06060707080809090A0B0B0C0C0D0D0E0E0F101011111212131314151516 | | | | |
| | | 29680 | | | |
| | | | CEL- | DT | 6,6,7,7,8,8,9,9,10,11,11, 12,12,13,13,14,14,15,16,16,17,17,18,18,19,19,20,21,21,22 |
| 0DCB | 1617171818191A1A1B1B1C1C1D1D1E1F1F | | | 29690 | |
| | | | CEL+ | DT | 22,23,23,24,24,25,26,26,2 7,27,28,28,29,29,30,31,31 |
| 0DDC | 20202121222223242425252626272728282929 | | | | |
| | | | | DT | 29700<br>32,32,33,33,34,34,35,36,3 6,37,37,38,38,39,39,40,41,41 |
| 0DEE | 2A2A2B2B2C2C2D2E2E2F2F30303131323333 | | | | |
| | | | | DT | 29710<br>42,42,43,43,44,44,45,46,4 6,47,47,48,48,49,49,50,51,51 |
| 0E00 | 34343535363637383839393A3A3B3B3C3D3D | | | | |
| | | | | DT | 29720<br>52,52,53,53,54,54,55,56,5 6,57,57,58,58,59,59,60,61,61 |
| 0E12 | 3E3E3F3F40404142424343444454546474? | | | | |
| | | | | DT | 29730<br>62,62,63,63,64,64,65,66,6 6,67,67,68,68,69,69,70,71,71 |
| 0E24 | 484849494A4A4B4C4C4D4D4E4E4F4F505151 | | | | |
| | | | | DT | 29740<br>72,72,73,73,74,74,75,76,7 6,77,77,78,78,79,79,80,81,81 |
| 0E36 | 5252535354545556565757585859595A5B5B | | | | |
| | | | | DT | 29750<br>82,82,83,83,84,84,85,86,8 6,87,87,88,88,89,89,90,91,91 |
| 0E48 | 5C5C5D5D5E5E5F6060616162626363646565 | | | | |
| | | | | DT | 29760<br>92,92,93,93,94,94,95,96,9 6,97,97,98,98,99,99,100,101,101 |
| 0E5A | 666667676868696A6A6B6B6C6C6D6D6E6F6F | | | | |
| | | | | DT | 29770<br>102,102,103,103,104,104,1 05,106,106,107,107,108,108,109,109,110,111,111 |
| 0E6C | 70707171727273747475757676777778787979 | | | | |
| | | | | DT | 29780<br>112,112,113,113,114,114,1 15,116,116,117,117,118,118,119,119,120,121,121 |
| 0E7E | 7A7A7B7B7C7C7D7E7E7F7F80808181828383 | | | | |
| | | | | DT | 29790<br>122,122,123,123,124,124,1 |

```
25,126,126,127,127,128,128,129,129,130,131,131
0E90     8484858586868788888E9898A8A8B8B8C8D8D
                                                    DT
35,136,136,137,137,138,138,139,139,140,141,141
0EA2     8F8E8F8F9090919292939394949595969797
                                                    DT
45,146,146,147,147,148,148,149,149,150,151,151
0EB4     989899999A9A9B9C9C9D9D9E9E9F9FA0
                                                    DT
55,156,156,157,157,158,158,159,159,160
0EC4     A1A1A2A2A3A3A4                     29830

64
```

```
                                              29800
                                132,132,133,133,134,134,1
                                              29810
                                142,142,143,143,144,144,1
                                              29820
                                152,152,153,153,154,154,1

DT
                                161,161,162,162,163,163,1
```

What is claimed is:

1. A control device for a hot water heating system having a boiler, a water pump and a motor controlled mixing valve, the device comprising:
   means for sensing the temperature outside of the area to be heated;
   means for selecting a predetermined pump set point;
   means responsive to the outside temperature for turning the pump on and off when the outside temperature respective drops below and exceeds the predetermined pump set point;
   means for sensing the actual water temperature in the system;
   means defining a set of water reset ratios of the outside temperature to the water temperature and a range of offset adjustments for each ratio including means for selecting a water reset ratio and offset therefor;
   means for periodically determining the desired water temperature at the output of the mixing valve for the selected water reset ratio and offset and receptive of the actual water temperature for comparing the actual water temperature to the desired water temperature; and
   means for step controlling the mixing valve when the pump is turned on to open and close same when the actual water temperature respectively drops below and exceeds the desired water temperature, comprising means defining a correction cycle having given period, means for stepping the valve motor for a maximum given time during each correction cycle in dependence on the difference between the actual and desired water temperatures and wherein the means for periodically determining the desired water temperature computes the desired temperature during the remainder of each correction cycle period.

2. The device according to claim 1, wherein the valve motor is stepped to correct for 5° in the first second of the correction cycle and for 1° per second thereafter with a maximum correction of 15° per cycle and wherein the remainder of the cycle has a duration of 30 seconds.

3. The device according to claim 1, further comprising electronic timing means for dividing each day into at least one normal period and at least one setback period and for storing the starting times for each period.

4. The device according to claim 1, further comprising means for displaying when the pump is on or off and when the water temperature is being corrected.

5. The device according to claim 3, wherein the means for turning the pump on and off includes means for storing a first pump set point for the at least one normal period and a second pump set point for the at least one setback period.

6. The device according to claim 3, further comprising boosting means for elevating the desired water temperature to above the computed value by a fixed value for a duration prior to the earliest first normal period during each day in dependence on the outside temperature.

7. The device according to claim 3, wherein the timing means includes means for setting a first general heating level for the at least one normal period and a lower second general heating level for the at least one setback period, whereby the water temperature for the setback, period will be lower than that of the normal period for the same outdoor temperature.

8. The device according to claim 3, wherein the storing means includes means for storing the starting times of each period for each day of the week.

9. The device according to claim 3, further automatic boosting means for elevating the desired water temperature above the computed value by a selectable amount for a variable duration prior to the earliest normal period during each day in dependence on the outside temperature.

10. The device according to claim 3, further comprising automatic shutdown means for advancing the next setback off the period by a variable duration as a function of the outside temperature.

11. A control device for a hot water heating system having a boiler and a water pump, the device comprising:
   means for sensing the temperature outside of the area to be heated;
   means for selecting a predetermined pump set point;
   means responsive to the outside temperature for turning the pump on and off when the outside temperature respectively drops below and exceeds the predetermined pump set point;
   means for sensing the actual water temperature in the system;
   means defining a set of water reset ratios of the outside temperature to the water temperature and a range of offset adjustments for each ratio including means for selecting a water reset ratio and offset therefor;
   means for periodically determining the desired water temperature at the output of the mixing valve for the selected water reset ratio and offset and receptive of the actual water temperature for comparing the actual water temperature to the desired water temperature; and
   means for step controlling the mixing valve when the pump is turned on to open and close same when the actual water temperature respectively drops below and exceeds the desired water temperature, comprising means for varying the temperature differential about the computed water temperature for which the boiler is turned on and off.

* * * * *